US008745757B2

(12) United States Patent
Kaji et al.

(10) Patent No.: US 8,745,757 B2
(45) Date of Patent: Jun. 3, 2014

(54) ELECTRONIC DEVICE AND CONTROLLING METHOD OF ELECTRONIC DEVICE

(75) Inventors: Masaya Kaji, Kanagawa (JP); Naoharu Kido, Kanagawa (JP)

(73) Assignee: Fuji Xerox Co., Ltd., Tokyo (JP)

( * ) Notice: Subject to any disclaimer, the term of this patent is extended or adjusted under 35 U.S.C. 154(b) by 399 days.

(21) Appl. No.: 12/622,041

(22) Filed: Nov. 19, 2009

(65) Prior Publication Data

US 2010/0071058 A1  Mar. 18, 2010

Related U.S. Application Data

(62) Division of application No. 11/041,374, filed on Jan. 25, 2005, now Pat. No. 7,725,729.

(30) Foreign Application Priority Data

Jan. 28, 2004 (JP) ................................. 2004-019221
Jan. 28, 2004 (JP) ................................. 2004-019222

(51) Int. Cl.
*G06F 21/00* (2013.01)

(52) U.S. Cl.
USPC .......................................................... 726/28

(58) Field of Classification Search
USPC ................................. 726/26–28; 713/182–183
See application file for complete search history.

(56) References Cited

U.S. PATENT DOCUMENTS

| 5,500,717 A | 3/1996 | Altrieth, III |
| 6,336,149 B1 * | 1/2002 | Preston ............................. 710/1 |
| 6,463,435 B1 * | 10/2002 | Bergmans ............................. 1/1 |
| 2003/0051054 A1 * | 3/2003 | Redlich et al. ................. 709/246 |
| 2006/0139680 A1 | 6/2006 | Okamoto et al. |

FOREIGN PATENT DOCUMENTS

| CN | 1759596 A | 4/2006 |
| JP | 5-053990 A | 3/1993 |
| JP | 6-66048 B2 | 8/1994 |
| JP | 2001-007950 A | 1/2001 |

OTHER PUBLICATIONS

"Does New Generation Browser Exceed IE counterattack of Netscape 6," Internet magazine, Japan, Impress Corporation, Feb. 1, 2001, No. 73, p. 272-281.
"Privacy and Security Setting—Web Password," Netscape Communications Corporation, 2001, URL http://www.mozilla-japan.org/projects/security/pki/psm/hel p20/passwords help.html.
Notification of Reason for Refusal dated Apr. 22, 2010, issued in counterpart Japanese Application No. 2004-019222.
Japanese Office Action dated Sep. 9, 2008.

* cited by examiner

*Primary Examiner* — Edward Zee
(74) *Attorney, Agent, or Firm* — Sughrue Mion, PLLC

(57) ABSTRACT

The present invention provides an electronic device for performing a typical processing by storing a predetermined operating procedure and reproducing the stored operating procedure that controls suspending storing information related to an authentication, which includes a control unit, when an operation requiring a predetermined authentication is performed at the time when the predetermined operating procedure is stored.

13 Claims, 36 Drawing Sheets

FIG. 3A

| PLEASE SELECT MEMORY NUMBER CORRESPONDING TO REGISTRATION DESTINATION. | | | RESIDUAL AMOUNT OF COPY MEMORY 100% SET 1 |
|---|---|---|---|
| JOB MEMORY | | | CLOSE |
| ☐ CALL | 1 | (UNREGISTERED) | 5 (UNREGISTERED) |
| ▨ REGISTRATION | 2 | (UNREGISTERED) | 6 JOB MEMORY NUMBER 6 |
| ☐ DELETE | 3 | (UNREGISTERED) | 7 (UNREGISTERED) |
| ☐ NAME SETTING/ CHANGE | 4 | (UNREGISTERED) | 8 JOB MEMORY NUMBER 8 ★ |

FIG. 3B

PLEASE SELECT FUNCTION TO USE.

FUNCTION SWITCHING                                      RETURN

COPY          SCANNER/MAIL          FACSIMILE

FIG. 4A

PLEASE ENTER PASSWORD USING NUMBER BUTTONS AND PUSH 'CONFIRM' BUTTON.

MACHINE ADMINISTRATOR - ENTER PASSWORD [CANCEL]

PASSWORD

▶ [*****]   [CONFIRM]

FIG. 4B

IF YOU SELECT 'NORMAL OPERATION', YOU CAN PERFORM OPERATION, SUCH AS COPY, IN MACHINE ADMINISTRATOR MODE.
MACHINE MAY BE RESTARTED AFTER 'SPECIFICATION SETTING/REGISTRATION' OPERATION.
PLEASE PUSH 'PASSWORD' BUTTON TO TERMINATE MACHINE ADMINISTRATOR MODE.

MACHINE ADMINISTRATOR MENU

○ NORMAL OPERATION    ○ SPECIFICATION SETTING/ REGISTRATION

FIG. 4C

PLEASE SELECT ITEM.
MACHINE MAY BE RESTARTED AFTER OPERATION.

SPECIFICATION SETTING/REGISTRATION [CLOSE]

○ SPECIFICATION SETTING    ○ REGISTRATION/ CHANGE    ○ SETTING/CHANGING OF MACHINE ADMINISTRATOR PASSWORD

○ DEPARTMENT/AGGREGATION MANAGEMENT

FIG. 6A

| PLEASE SELECT MEMORY NUMBER CORRESPONDING TO REGISTRATION DESTINATION. | | RESIDUAL AMOUNT OF COPY MEMORY 100% SET 1 |
|---|---|---|
| JOB MEMORY | | CLOSE |
| ☐ CALL | 1 (UNREGISTERED) | 5 (UNREGISTERED) |
| ▨ REGISTRATION | 2 (UNREGISTERED) | 6 JOB MEMORY NUMBER 6 |
| ☐ DELETE | 3 (UNREGISTERED) | 7 (UNREGISTERED) |
| ☐ NAME SETTING/ CHANGE | 4 (UNREGISTERED) | 8 JOB MEMORY NUMBER 8 |

FIG. 6B

PLEASE SELECT FUNCTION TO USE.

FUNCTION SWITCHING — RETURN

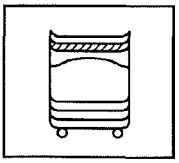    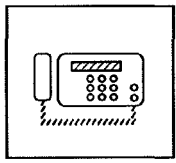

COPY    SCANNER/MAIL    FACSIMILE

FIG. 7

| PLEASE ENTER PASSWORD USING NUMBER BUTTONS AND PUSH 'CONFIRM' BUTTON. | |
|---|---|
| MACHINE ADMINISTRATOR - ENTER PASSWORD | CANCEL |

▶ PASSWORD [*****] [CONFIRM]

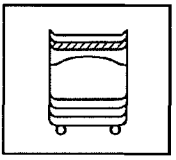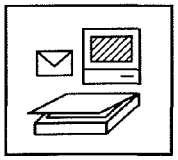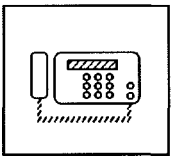

FIG. 10B

IF YOU SELECT 'NORMAL OPERATION', YOU CAN PERFORM OPERATION, SUCH AS COPY, IN MACHINE ADMINISTRATOR MODE.
MACHINE MAY BE RESTARTED AFTER 'SPECIFICATION SETTING/REGISTRATION' OPERATION.
PLEASE PUSH 'PASSWORD' BUTTON TO TERMINATE MACHINE ADMINISTRATOR MODE.

MACHINE ADMINISTRATOR MENU

 NORMAL OPERATION    SPECIFICATION SETTING/ REGISTRATION

FIG. 10C

PLEASE SELECT ITEM.
MACHINE MAY BE RESTARTED AFTER OPERATION.

SPECIFICATION SETTING/REGISTRATION [ CLOSE ]

 SPECIFICATION SETTING    REGISTRATION/ CHANGE    SETTING/CHANGING OF MACHINE ADMINISTRATOR PASSWORD

 DEPARTMENT/AGGREGATION MANAGEMENT

FIG. 12A

| PLEASE SELECT NUMBER CORRESPONDING TO REGISTERED MEMORY. WHEN YOU WANT TO PERFORM REGISTRATION, PLEASE SELECT 'REGISTRATION' AT THE BEGINNING. | | RESIDUAL AMOUNT OF COPY MEMORY 100% SET 1 |
|---|---|---|
| JOB MEMORY | | CLOSE |
| ▨ CALL | 1 (UNREGISTERED) | 5 (UNREGISTERED) |
| ☐ REGISTRATION | 2 (UNREGISTERED) | 6 JOB MEMORY NUMBER 6 |
| ☐ DELETE | 3 (UNREGISTERED) | 7 (UNREGISTERED) |
| ☐ NAME SETTING/ CHANGE | 4 (UNREGISTERED) | 8 JOB MEMORY NUMBER 8 |

FIG. 12B

PLEASE SELECT FUNCTION TO USE.

FUNCTION SWITCHING                              RETURN

   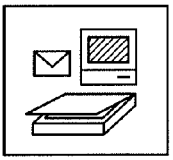   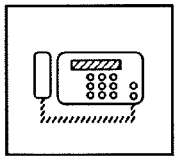

COPY       SCANNER/MAIL       FACSIMILE

FIG. 13A

PLEASE ENTER PASSWORD USING NUMBER BUTTONS AND PUSH 'CONFIRM' BUTTON.

MACHINE ADMINISTRATOR - ENTER PASSWORD  [CANCEL]

PASSWORD
▶ [*****]  [CONFIRM]

FIG. 13B

IF YOU SELECT 'NORMAL OPERATION', YOU CAN PERFORM OPERATION, SUCH AS COPY, IN MACHINE ADMINISTRATOR MODE.
MACHINE MAY BE RESTARTED AFTER 'SPECIFICATION SETTING/REGISTRATION' OPERATION.
PLEASE PUSH 'PASSWORD' BUTTON TO TERMINATE MACHINE ADMINISTRATOR MODE.

MACHINE ADMINISTRATOR MENU

○ NORMAL OPERATION    ○ SPECIFICATION SETTING/ REGISTRATION

FIG. 13C

PLEASE SELECT ITEM.
MACHINE MAY BE RESTARTED AFTER OPERATION.

SPECIFICATION SETTING/REGISTRATION  [CLOSE]

○ SPECIFICATION SETTING    ○ REGISTRATION/ CHANGE    ○ SETTING/CHANGING OF MACHINE ADMINISTRATOR PASSWORD

○ DEPARTMENT/AGGREGATION MANAGEMENT

FIG. 14A

| | | | | | |
|---|---|---|---|---|---|
| PLEASE SELECT NUMBER CORRESPONDING TO REGISTERED MEMORY. WHEN YOU WANT TO PERFORM REGISTRATION, PLEASE SELECT 'REGISTRATION' AT THE BEGINNING. | | | | RESIDUAL AMOUNT OF COPY MEMORY 100% SET 1 | |
| JOB MEMORY | | | | | CLOSE |
| ▓ | CALL | 1 | (AUTHENTICATION IS INCLUDED) | 5 | (UNREGISTERED) |
| ☐ | REGISTRATION | 2 | (UNREGISTERED) | 6 | JOB MEMORY NUMBER 6 |
| ☐ | DELETE | 3 | (AUTHENTICATION IS INCLUDED) | 7 | (UNREGISTERED) |
| ☐ | NAME SETTING/ CHANGE | 4 | (UNREGISTERED) | 8 | JOB MEMORY NUMBER 8 |

FIG. 14B

| | | | | | |
|---|---|---|---|---|---|
| PLEASE SELECT NUMBER CORRESPONDING TO REGISTERED MEMORY. WHEN YOU WANT TO PERFORM REGISTRATION, PLEASE SELECT 'REGISTRATION' AT THE BEGINNING. | | | | RESIDUAL AMOUNT OF COPY MEMORY 100% SET 1 | |
| JOB MEMORY | | | | | CLOSE |
| ▓ | CALL | 1 | (UNREGISTERED) | 5 | (UNREGISTERED) |
| ☐ | REGISTRATION | 2 | (UNREGISTERED) | 6 | JOB MEMORY NUMBER 6 (AUTHENTICATION IS INCLUDED) |
| ☐ | DELETE | 3 | (UNREGISTERED) | 7 | (UNREGISTERED) |
| ☐ | NAME SETTING/ CHANGE | 4 | (UNREGISTERED) | 8 | JOB MEMORY NUMBER 8 (AUTHENTICATION IS INCLUDED) |

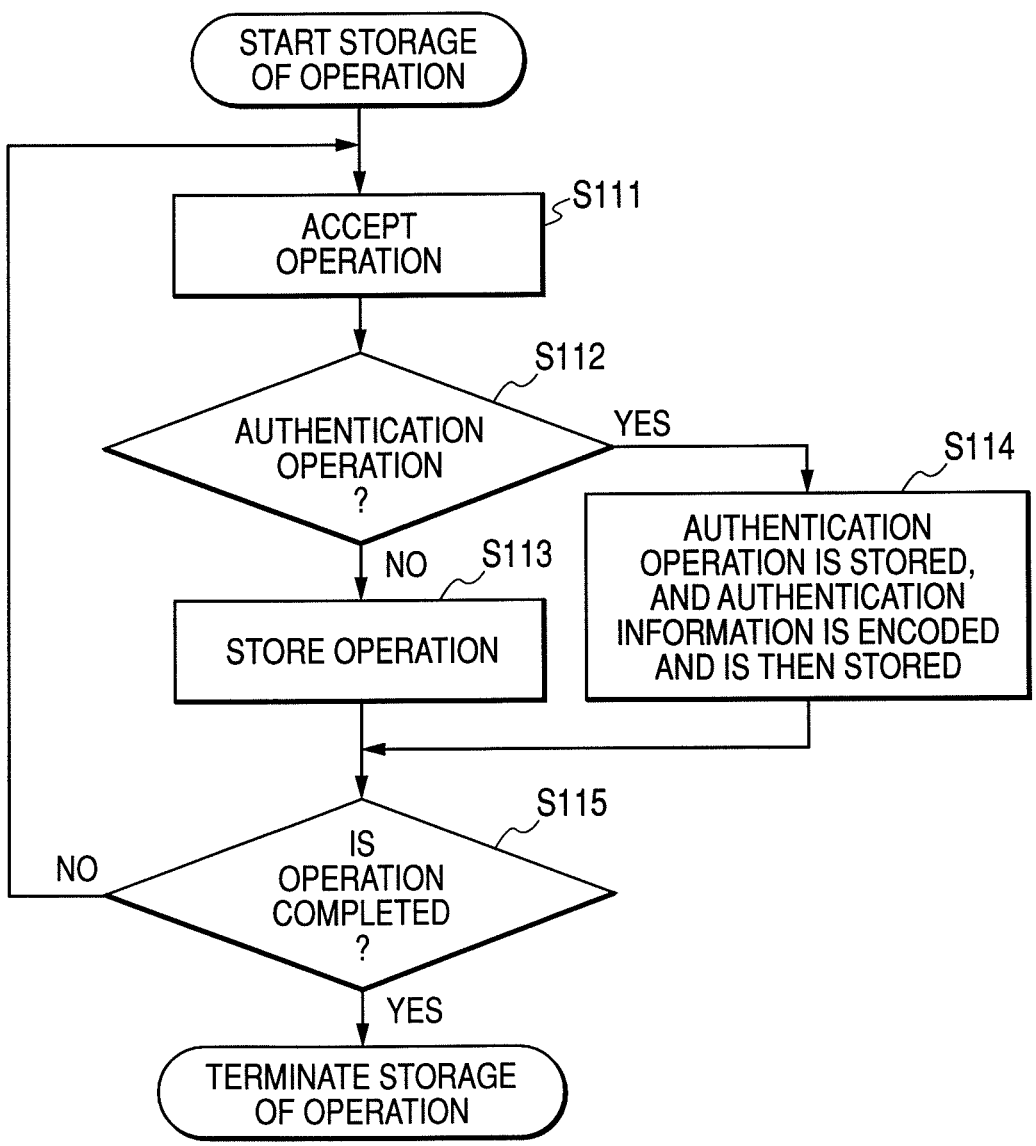

FIG. 17A

| PLEASE SELECT MEMORY NUMBER CORRESPONDING TO REGISTRATION DESTINATION. | | RESIDUAL AMOUNT OF COPY MEMORY 100% SET 1 |
|---|---|---|
| JOB MEMORY | | CLOSE |

| ☐ CALL | 1 | (UNREGISTERED) | 5 | (UNREGISTERED) |
|---|---|---|---|---|
| ▨ REGISTRATION | 2 | (UNREGISTERED) | 6 | JOB MEMORY NUMBER 6 |
| ☐ DELETE | 3 | (UNREGISTERED) | 7 | (UNREGISTERED) |
| ☐ NAME SETTING/ CHANGE | 4 | (UNREGISTERED) | 8 | JOB MEMORY NUMBER 8 |

FIG. 17B

PLEASE SELECT FUNCTION TO USE.

| FUNCTION SWITCHING | RETURN |
|---|---|

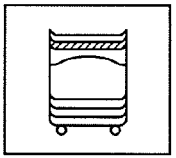 COPY    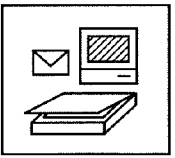 SCANNER/MAIL    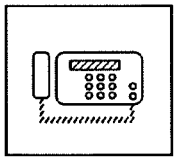 FACSIMILE

FIG. 18A

PLEASE ENTER PASSWORD USING NUMBER BUTTONS AND PUSH 'CONFIRM' BUTTON.

| MACHINE ADMINISTRATOR - ENTER PASSWORD | CANCEL |

PASSWORD

▶ [*****]   [CONFIRM]

FIG. 18B

IF YOU SELECT 'NORMAL OPERATION', YOU CAN PERFORM OPERATION, SUCH AS COPY, IN MACHINE ADMINISTRATOR MODE.
MACHINE MAY BE RESTARTED AFTER 'SPECIFICATION SETTING/REGISTRATION' OPERATION.
PLEASE PUSH 'PASSWORD' BUTTON TO TERMINATE MACHINE ADMINISTRATOR MODE.

MACHINE ADMINISTRATOR MENU

○ NORMAL OPERATION      ○ SPECIFICATION SETTING/ REGISTRATION

FIG. 18C

PLEASE SELECT ITEM.
MACHINE MAY BE RESTARTED AFTER OPERATION.

| SPECIFICATION SETTING/REGISTRATION | CLOSE |

○ SPECIFICATION SETTING      ○ REGISTRATION/ CHANGE      ○ SETTING/CHANGING OF MACHINE ADMINISTRATOR PASSWORD

○ DEPARTMENT/AGGREGATION MANAGEMENT

FIG. 20A

| | | | | | | |
|---|---|---|---|---|---|---|
| PLEASE SELECT NUMBER CORRESPONDING TO REGISTERED MEMORY. WHEN YOU WANT TO PERFORM REGISTRATION, PLEASE SELECT 'REGISTRATION' AT THE BEGINNING. | | | | RESIDUAL AMOUNT OF COPY MEMORY 100% SET 1 | | |
| JOB MEMORY | | | | | | CLOSE |
| ▓ | CALL | 1 | (UNREGISTERED) | 5 | (UNREGISTERED) | |
| ☐ | REGISTRATION | 2 | (UNREGISTERED) | 6 | JOB MEMORY NUMBER 6 | |
| ☐ | DELETE | 3 | (UNREGISTERED) | 7 | (UNREGISTERED) | |
| ☐ | NAME SETTING/ CHANGE | 4 | (UNREGISTERED) | 8 | JOB MEMORY NUMBER 8 | |

FIG. 20B

PLEASE SELECT FUNCTION TO USE.

FUNCTION SWITCHING     RETURN

COPY     SCANNER/MAIL     FACSIMILE

FIG. 21A

PLEASE ENTER PASSWORD USING NUMBER BUTTONS AND PUSH 'CONFIRM' BUTTON.

MACHINE ADMINISTRATOR - ENTER PASSWORD     [ CANCEL ]

PASSWORD
▶ [ ***** ]   [ CONFIRM ]

FIG. 21B

IF YOU SELECT 'NORMAL OPERATION', YOU CAN PERFORM OPERATION, SUCH AS COPY, IN MACHINE ADMINISTRATOR MODE.
MACHINE MAY BE RESTARTED AFTER 'SPECIFICATION SETTING/REGISTRATION' OPERATION.
PLEASE PUSH 'PASSWORD' BUTTON TO TERMINATE MACHINE ADMINISTRATOR MODE.

MACHINE ADMINISTRATOR MENU

○ NORMAL OPERATION     ○ SPECIFICATION SETTING/ REGISTRATION

FIG. 21C

PLEASE SELECT ITEM.
MACHINE MAY BE RESTARTED AFTER OPERATION.

SPECIFICATION SETTING/REGISTRATION     [ CLOSE ]

○ SPECIFICATION SETTING     ○ REGISTRATION/ CHANGE     ○ SETTING/CHANGING OF MACHINE ADMINISTRATOR PASSWORD

○ DEPARTMENT/AGGREGATION MANAGEMENT

FIG. 23A

| PLEASE SELECT NUMBER CORRESPONDING TO REGISTERED MEMORY. WHEN YOU WANT TO PERFORM REGISTRATION, PLEASE SELECT 'REGISTRATION' AT THE BEGINNING. | | | RESIDUAL AMOUNT OF COPY MEMORY 100% SET 1 | |
|---|---|---|---|---|
| JOB MEMORY | | | | CLOSE |
| ☒ CALL | 1 | (UNREGISTERED) | 5 | (UNREGISTERED) |
| ☐ REGISTRATION | 2 | (UNREGISTERED) | 6 | JOB MEMORY NUMBER 6 |
| ☐ DELETE | 3 | (UNREGISTERED) | 7 | (UNREGISTERED) |
| ☐ NAME SETTING/ CHANGE | 4 | (UNREGISTERED) | 8 | JOB MEMORY NUMBER 8 |

FIG. 23B

PLEASE ENTER PASSWORD USING NUMBER BUTTONS AND PUSH 'CONFIRM' BUTTON.

| MACHINE ADMINISTRATOR - ENTER PASSWORD | CANCEL |
|---|---|

PASSWORD

▶ *****     CONFIRM

FIG. 23C

PLEASE SELECT FUNCTION TO USE.

| FUNCTION SWITCHING | RETURN |
|---|---|

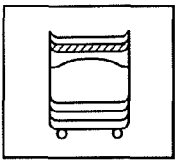        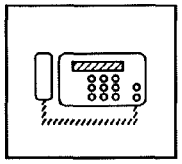

COPY      SCANNER/MAIL      FACSIMILE

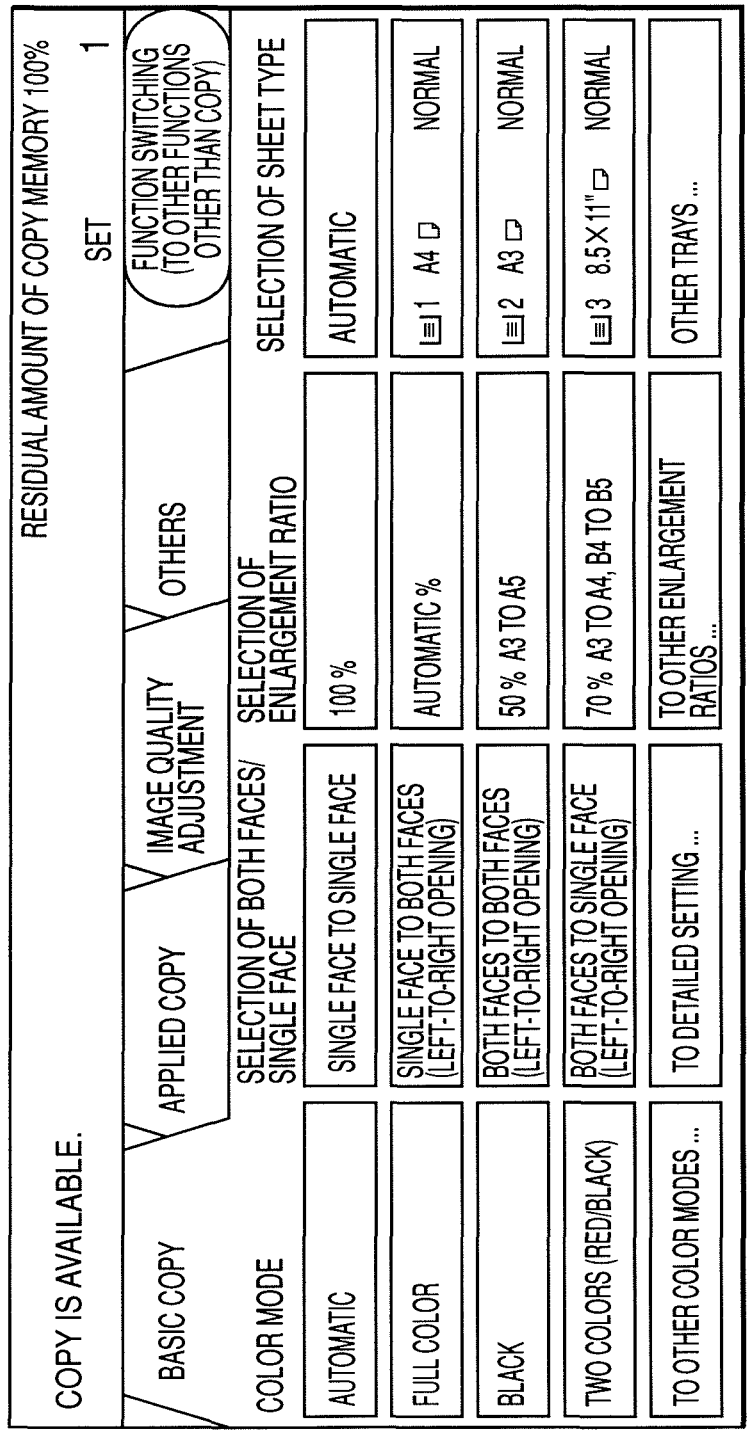

FIG. 24B

IF YOU SELECT 'NORMAL OPERATION', YOU CAN PERFORM OPERATION, SUCH AS COPY, IN MACHINE ADMINISTRATOR MODE.
MACHINE MAY BE RESTARTED AFTER 'SPECIFICATION SETTING/REGISTRATION' OPERATION.
PLEASE PUSH 'PASSWORD' BUTTON TO TERMINATE MACHINE ADMINISTRATOR MODE.

MACHINE ADMINISTRATOR MENU

○ NORMAL OPERATION   ○ SPECIFICATION SETTING/ REGISTRATION

FIG. 24C

PLEASE SELECT ITEM.
MACHINE MAY BE RESTARTED AFTER OPERATION.

SPECIFICATION SETTING/REGISTRATION    [ CLOSE ]

○ SPECIFICATION SETTING   ○ REGISTRATION/ CHANGE   ○ SETTING/CHANGING OF MACHINE ADMINISTRATOR PASSWORD

○ DEPARTMENT/AGGREGATION MANAGEMENT

FIG. 26A

| PLEASE SELECT NUMBER CORRESPONDING TO REGISTERED MEMORY. WHEN YOU WANT TO PERFORM REGISTRATION, PLEASE SELECT 'REGISTRATION' AT THE BEGINNING. | | RESIDUAL AMOUNT OF COPY MEMORY 100% SET 1 | |
|---|---|---|---|
| JOB MEMORY | | | CLOSE |
| ▓ CALL | 1 (UNREGISTERED) | 5 | (UNREGISTERED) |
| ☐ REGISTRATION | 2 (UNREGISTERED) | 6 | JOB MEMORY NUMBER 6 |
| ☐ DELETE | 3 (UNREGISTERED) | 7 | (UNREGISTERED) |
| ☐ NAME SETTING/ CHANGE | 4 (UNREGISTERED) | 8 | JOB MEMORY NUMBER 8 |

FIG. 26B

PLEASE SELECT FUNCTION TO USE.

FUNCTION SWITCHING　　　　　　　　　　　　　　RETURN

COPY　　　　SCANNER/MAIL　　　　FACSIMILE

FIG. 27A

PLEASE ENTER PASSWORD USING NUMBER BUTTONS AND PUSH 'CONFIRM' BUTTON.

MACHINE ADMINISTRATOR - ENTER PASSWORD | CANCEL

PASSWORD
▶ [*****]  CONFIRM

FIG. 27B

IF YOU SELECT 'NORMAL OPERATION', YOU CAN PERFORM OPERATION, SUCH AS COPY, IN MACHINE ADMINISTRATOR MODE.
MACHINE MAY BE RESTARTED AFTER 'SPECIFICATION SETTING/REGISTRATION' OPERATION.
PLEASE PUSH 'PASSWORD' BUTTON TO TERMINATE MACHINE ADMINISTRATOR MODE.

MACHINE ADMINISTRATOR MENU

○ NORMAL OPERATION   ○ SPECIFICATION SETTING/ REGISTRATION

FIG. 27C

PLEASE SELECT ITEM.
MACHINE MAY BE RESTARTED AFTER OPERATION.

SPECIFICATION SETTING/REGISTRATION | CLOSE

○ SPECIFICATION SETTING   ○ REGISTRATION/ CHANGE   ○ SETTING/CHANGING OF MACHINE ADMINISTRATOR PASSWORD

○ DEPARTMENT/AGGREGATION MANAGEMENT

FIG. 28A

| | | | | |
|---|---|---|---|---|
| PLEASE SELECT NUMBER CORRESPONDING TO REGISTERED MEMORY. WHEN YOU WANT TO PERFORM REGISTRATION, PLEASE SELECT 'REGISTRATION' AT THE BEGINNING. | | | RESIDUAL AMOUNT OF COPY MEMORY 100% SET 1 | |
| JOB MEMORY | | | | CLOSE |
| ■ CALL | 1 | (AUTHENTICATION IS INCLUDED) | 5 | (UNREGISTERED) |
| □ REGISTRATION | 2 | (UNREGISTERED) | 6 | JOB MEMORY NUMBER 6 |
| □ DELETE | 3 | (AUTHENTICATION IS INCLUDED) | 7 | (UNREGISTERED) |
| □ NAME SETTING/ CHANGE | 4 | (UNREGISTERED) | 8 | JOB MEMORY NUMBER 8 |

FIG. 28B

| | | | | |
|---|---|---|---|---|
| PLEASE SELECT NUMBER CORRESPONDING TO REGISTERED MEMORY. WHEN YOU WANT TO PERFORM REGISTRATION, PLEASE SELECT 'REGISTRATION' AT THE BEGINNING. | | | RESIDUAL AMOUNT OF COPY MEMORY 100% SET 1 | |
| JOB MEMORY | | | | CLOSE |
| ■ CALL | 1 | (AUTHENTICATION DOES NOT CORRESPOND) | 5 | (UNREGISTERED) |
| □ REGISTRATION | 2 | (UNREGISTERED) | 6 | JOB MEMORY NUMBER 6 (AUTHENTICATION IS INCLUDED) |
| □ DELETE | 3 | (AUTHENTICATION DOES NOT CORRESPOND) | 7 | (UNREGISTERED) |
| □ NAME SETTING/ CHANGE | 4 | (UNREGISTERED) | 8 | JOB MEMORY NUMBER 8 |

ELECTRONIC DEVICE AND CONTROLLING METHOD OF ELECTRONIC DEVICE

CROSS-REFERENCE TO RELATED APPLICATIONS

This is a divisional of U.S. application Ser. No. 11/041,374, filed Jan. 25, 2005 now U.S. Pat. No. 7,725,729, which claims priority under 35 USC 119 from Japanese Patent Application Nos. 2004-019221 and 2004-019222. The entire disclosures of the prior applications are incorporated by reference herein.

BACKGROUND OF THE INVENTION

1. Field of the Invention

The present invention relates to an electronic device for performing a typical processing by storing a predetermined operating procedure and reproducing the stored operating procedure, and to a controlling method of the electronic device.

2. Description of the Related Art

Conventionally, there has been disclosed an electronic device, such as a duplicating machine, capable of performing a typical function of storing a predetermined operating procedure, of reading the stored operating procedure, and of reproducing it. This function is called, for example, a job memory, and an operating procedure normally used is stored therein. Therefore, it is possible to automatically perform a series of operations only by a simple memory calling operation.

However, in storing the operating procedure, when an operation requiring a predetermined authentication is included in the operating procedure, information related to the authentication must be stored. Therefore, when the stored operation is read and reproduced by mistake, unauthorized users can obtain authentication. For example, in a duplicating machine having a machine administrator mode for managing the specifications thereof and a maintenance mode that is permitted by only a service man for performing maintenance, key operations and authentication information, such as a password, are necessary to perform the switching to these modes. When the authentication information is stored, unauthorized users other than the machine administrator or service men can perform the switching to these modes. In addition, when the authentication information, such as a password, is stored, there is a possibility of danger in that the internally stored information will be read to decode the authentication information.

SUMMARY OF THE INVENTION

The present invention provides an electronic device for performing a typical processing by storing a predetermined operating procedure and reproducing the stored operating procedure, and the electronic device performs control such that the storage of information related to an authentication is suspended, when an operation requiring a predetermined authentication is performed at the time when the predetermined operating procedure is stored. In addition, according to an aspect of the present invention, the electronic device performs control such that an operating procedure stored until that time is removed, when the operation requiring the predetermined authentication is performed at the time when the predetermined operating procedure is stored.

Further, according to an aspect of the present invention, an electronic device performs control such that information related to an predetermined authentication is accepted, prior to the reproduction of an operating procedure, when an operation requiring the predetermined authentication is included in the operating procedure at the time when the stored operating procedure is reproduced. In addition, according to an aspect of the present invention, an electronic device performs control such that the reproduction is temporarily suspended to accept information related to a predetermined authentication, when an operation requiring the predetermined authentication is performed at the time when the stored operating procedure is reproduced.

Furthermore, the present invention provides an electronic device for performing a typical processing by storing a predetermined operating procedure and reproducing the stored operating procedure, and the electronic device includes an encoding unit that encodes information related to an authentication, when an operation requiring a predetermined authentication is performed at the time when the predetermined operating procedure is stored. In addition, an electronic device includes a decoding unit that decodes the information related to the authentication encoded by the encoding unit.

The electronic device having a function of storing the operating procedure can be constructed such that the information related to the predetermined authentication is not stored. In addition, in the electronic device having the function of storing the operating procedure, the information related to the predetermined authentication is encoded and is then stored. When the stored operating procedure is reproduced, the encoded information is decoded. Therefore, since the information related to the authentication is stored within the machine in an encoded state, there is little possibility that the information will leak to the outside. Further, since the encoded information related to the authentication is decoded at the time of reproduction, the user can reproduce operations easily, so that the present invention improves the usability. Thus, the present invention makes it possible to improve both the convenience of users and the security of the internal information.

Therefore, according to the present invention, it is possible to prevent a user who does not know information related to authentication from obtaining authentication and from performing unauthorized operations, using a function of storing and reproducing an operating procedure. In addition, since the information related to the authentication is not stored, it is possible to prevent users from illegally obtaining the information related to the authentication, and thus it is possible to improve the security of an electronic device having a function of storing and reproducing an operating procedure.

BRIEF DESCRIPTION OF THE DRAWINGS

Embodiments of the present invention will be described in detail based on the following figures, wherein:

FIGS. 3A to 3C are views (part 1) illustrating screens displayed on an operating panel according to the first embodiment;

FIGS. 4A to 4C are views (part 2) illustrating screens displayed on the operating panel according to the first embodiment;

FIGS. 6A to 6C are views (part 1) illustrating screens displayed on an operating panel according to the second embodiment;

FIG. 7 is a view (part 2) illustrating a screen displayed on the operating panel according to the second embodiment;

FIGS. 9A to 9C are views (part 1) illustrating screens displayed on an operating panel according to the third embodiment;

FIGS. 10A to 10C are views (part 2) illustrating screens displayed on the operating panel according to the third embodiment;

FIGS. 12A to 12C are views (part 1) illustrating screens displayed on an operating panel according to the fourth embodiment;

FIGS. 13A to 13C are views (part 2) illustrating screens displayed on the operating panel according to the fourth embodiment;

FIGS. 14A and 14B are views illustrating screens displayed when the stored operation is reproduced;

FIG. 16 is a flow chart illustrating the operation of a control unit according to a fifth embodiment;

FIGS. 17A to 17C are views (part 1) illustrating screens displayed on an operating panel according to the fifth embodiment;

FIGS. 18A to 18C are views (part 2) illustrating screens displayed on the operating panel according to the fifth embodiment;

FIGS. 20A to 20C are views (part 1) illustrating screens displayed on an operating panel according to the sixth embodiment;

FIGS. 21A to 21C are views (part 2) illustrating screens displayed on the operating panel according to the sixth embodiment;

FIGS. 23A to 23C are views (part 1) illustrating screens displayed on an operating panel in the reproducing operation (part 1);

FIGS. 24A to 24C are views (part 2) illustrating screens displayed on the operating panel in the reproducing operation (part 2);

FIGS. 26A to 26C are views (part 1) illustrating screens displayed on an operating panel in the reproducing operation (part 2);

FIGS. 27A to 27C are views (part 2) illustrating screens displayed on the operating panel in the reproducing operation (part 2); and FIGS. 28A and 28B are views illustrating screens displayed when the stored operation is reproduced.

DETAILED DESCRIPTION OF THE INVENTION

Figure 1:
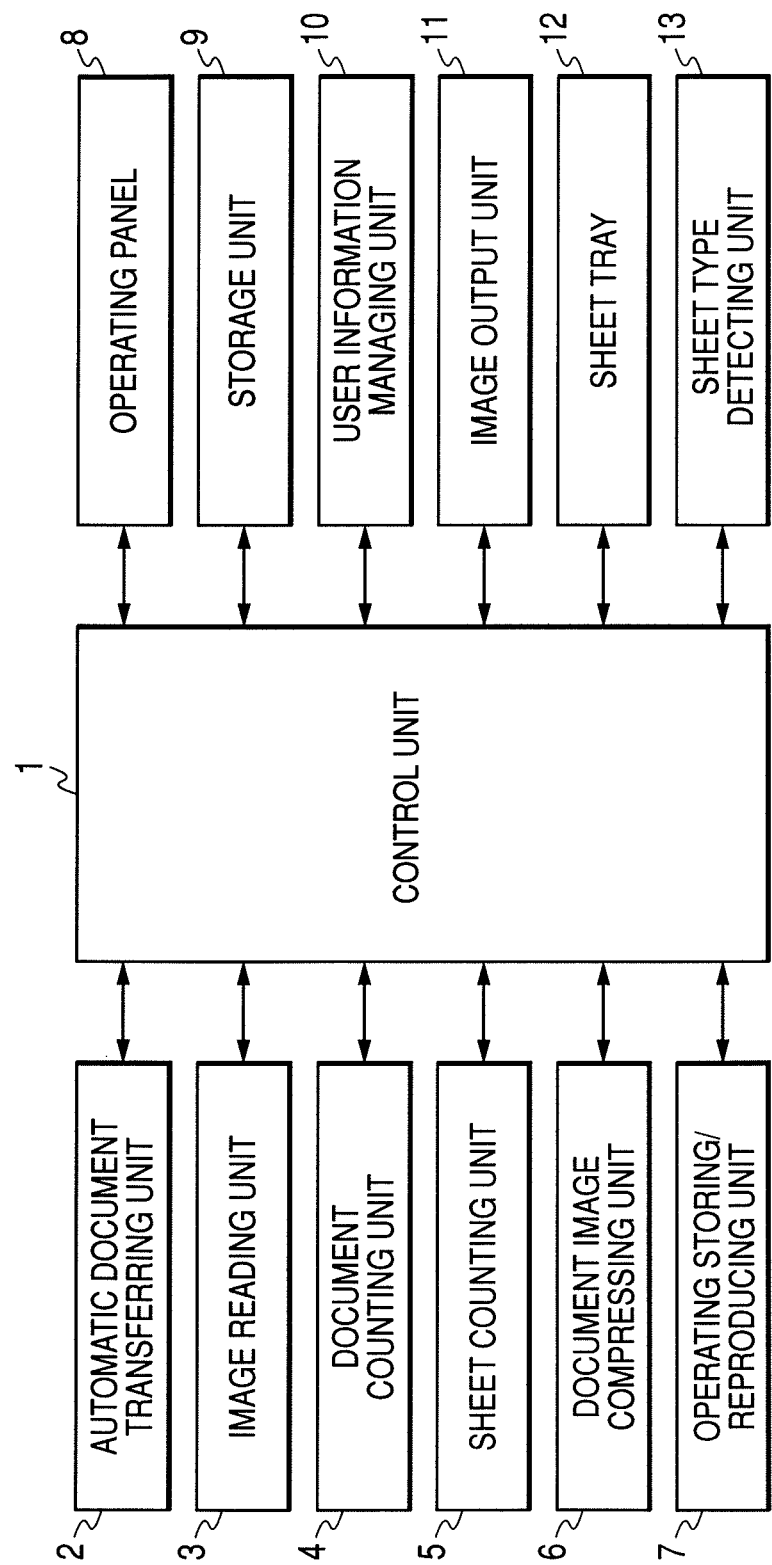
FIG. 1 is a view illustrating a compound machine, which is an example of an electronic device according to an exemplary embodiment of the present invention.

Hereinafter, exemplary embodiments of the present invention will be described with reference to the accompanying drawings. FIG. 1 is a block diagram illustrating a compound machine, which is an example of an electronic device according to an exemplary embodiment of the present invention. The compound machine includes a control unit 1, an automatic document transferring unit 2, an image reading unit 3, a document counting unit 4, a sheet counting unit 5, a document image compressing unit 6, an operation storing/reproducing unit 7, an operating panel 8, a storage unit 9, a user information managing unit 10, an image output unit 11, a sheet tray 12, and a sheet type detecting unit 13.

In this compound machine, a predetermined operating procedure other than general operations (for example, a copy operation, a facsimile operation, and a printing operation) is stored as a job memory. Then, the compound machine performs a typical process by reading and reproducing the stored job memory. For example, a series of operations, such as the selection of the facsimile operation, the selection of a predetermined destination, the reading of a document, a telephone connection, and the transmission of a document image, is stored. Then, when the same process is performed, it is possible to simply perform the same process only by selecting a button for calling the stored contents thereof.

The present embodiment is characterized by improving the security of information in using an electronic device having such an operating procedure storing/reproducing function. That is, in the electronic device according to the present embodiment, the control unit 1 controls the function of storing the operating procedure such that, when an operation requiring a predetermined authentication is performed, information (authentication information) related to the authentication is not stored. In addition, the control unit 1 controls the function of reproducing the stored operating procedure such that, when the operation requiring the predetermined authentication is performed, the authentication information is manually input.

Figure 2:
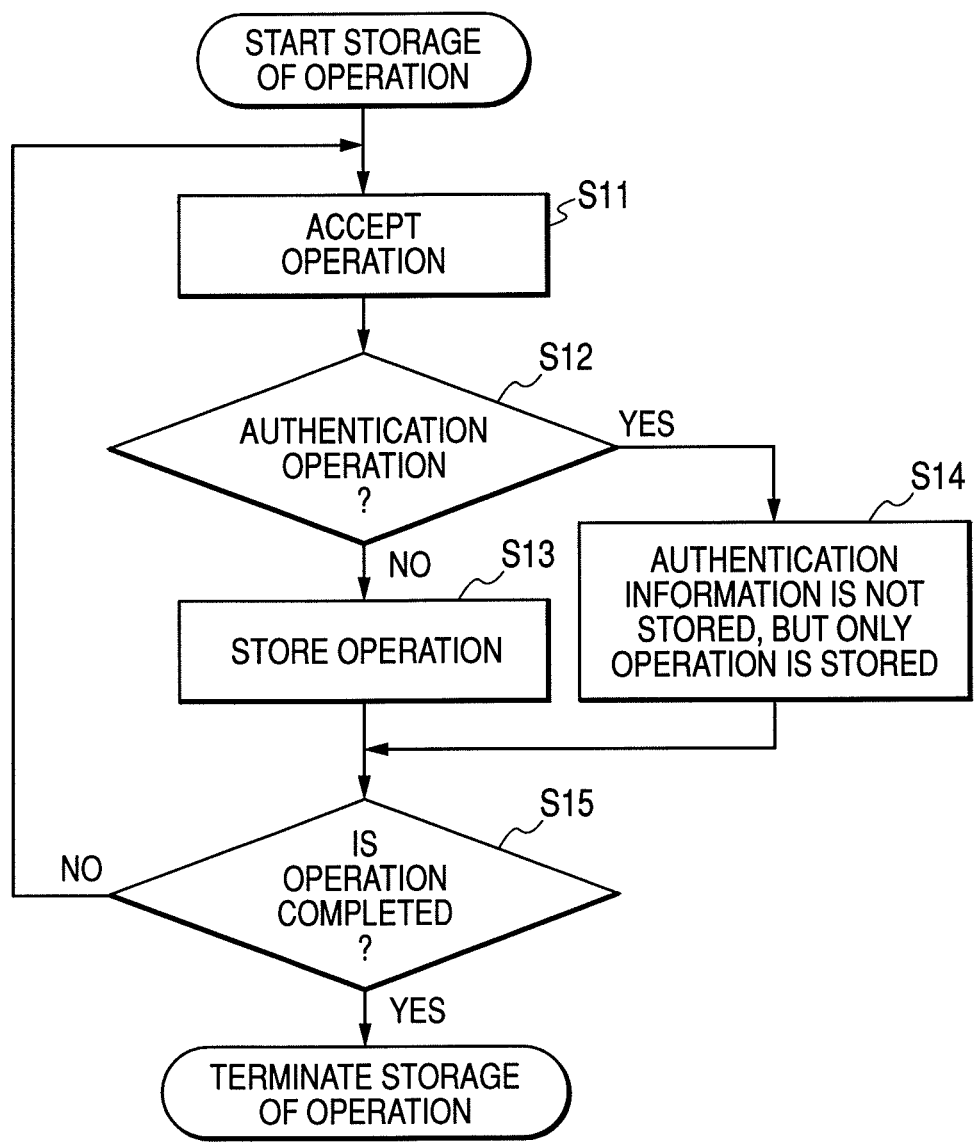
FIG. 2 is a flow chart illustrating the operation of a control unit according to a first embodiment.
Figure 3C:
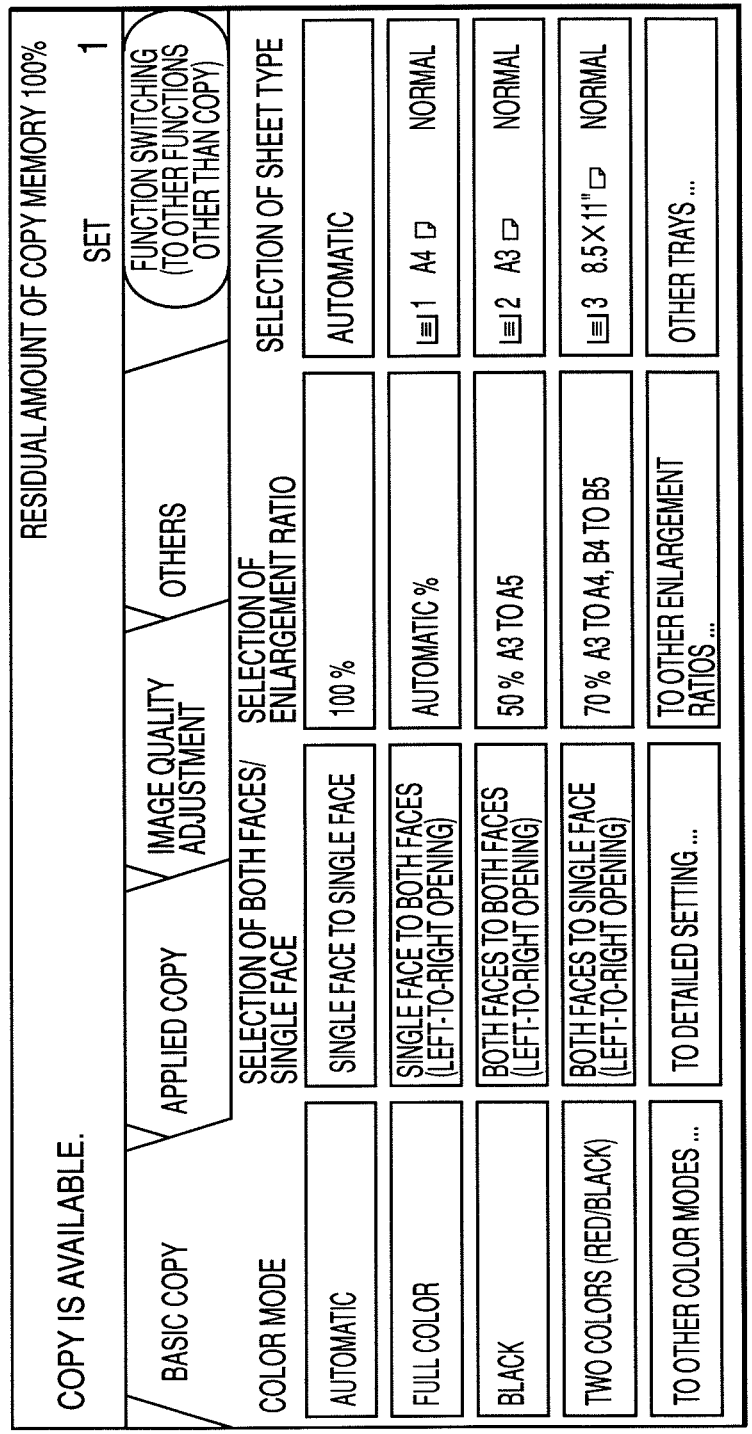

First, a first embodiment will be described. FIG. 2 is a flow chart illustrating the operation (control method) of a control unit according to the first embodiment, and FIGS. 3A to 4C are views respectively showing screens displayed on an operating panel according to the first embodiment.

In the first embodiment, in storing a predetermined operating procedure, when an operation requiring a predetermined authentication is performed, the control unit allows the authentication information not to be stored. According to the control method by the control unit 1, first, when the storage of an operation starts, the selected operation is accepted as shown in step S11. As shown on the screen of FIG. 3A, the storage of the operation starts by selecting a 'registration' button and by selecting one of buttons corresponding to 'unregistered' memories. FIG. 3B shows a screen displayed when a button corresponding to the storing operation is selected. In FIG. 3B, a 'copy' button is selected.

Next, the control unit 1 determines whether the operation is an authentication operation (step S12 in FIG. 2). As shown on the screen of FIG. 3B, for example, when the 'copy' button is selected to perform the copy operation, it is not necessary to perform the authentication operation in step S12, so that the process proceeds to step S13 to store the operation. When the 'copy' button is pushed, the screen changes to a general copy condition setting screen shown in FIG. 3C.

When an operation to be performed remains, it is determined that the operation is not completed in step S15, so that the process returns to step S11 to wait for accepting the next operation. Next, for example, in order to move to an administrator mode, it is necessary to enter a password (hard key). In this case, the screen changes to a screen for entering a password, as shown in FIG. 4A.

The control unit 1 determines that this operation is the authentication operation in step S12 and then performs step S14. In step S14, the authentication information (for example, a password) input by the authentication operation is not stored, and only the authentication operation is stored. In storing the authentication operation, a command for allowing a screen (for example, FIG. 4A) for inputting information related to the authentication to be displayed and a flag indicating the authentication operation are stored.

Next, a user enters a password and then pushes a 'confirm' button. Then, user authentication is performed by the control unit. When the authentication is succeeded, the next operation is performed. An example of a machine administrator menu is shown in FIG. 4B. Subsequently, for example, when a 'specification setting/registration' button is pushed, the screen shown in FIG. 4C appears, so that it is possible to set up various items. Such a series of operation is also stored. When the operation is completed, a predetermined key is pushed to complete the storing operation. In this way, a series of operations from the storing operation is stored corresponding to the unregistered numbers displayed on the screen of FIG. 3A. In this case, for a number corresponding to the memory including the authentication operation among the stored operations, a mark indicating that the authentication operation is included in a series of operations, for example, an asterisk may be put on the right side of 'a job memory—No. 8' as shown on the screen of FIG. 3A.

As such, when the authentication operation is included, the control unit allows information (authentication information, such as a password) related to authentication not to be stored. Therefore, it is possible to prevent a user who does not know the authentication information from performing the authentication operation. In addition, since the authentication information is not stored, it is possible to prevent the authentication information from leaking to the outside even when the internal storage unit 9 is analyzed.

Further, in the first embodiment, the authentication information is not stored. However, the authentication information may be stored by a switching unit (for example, setting in the machine administrator mode). Then, it is possible to select whether to store the authentication information or not, if necessary, which results in the improvement of the convenience of users.

Figure 5:
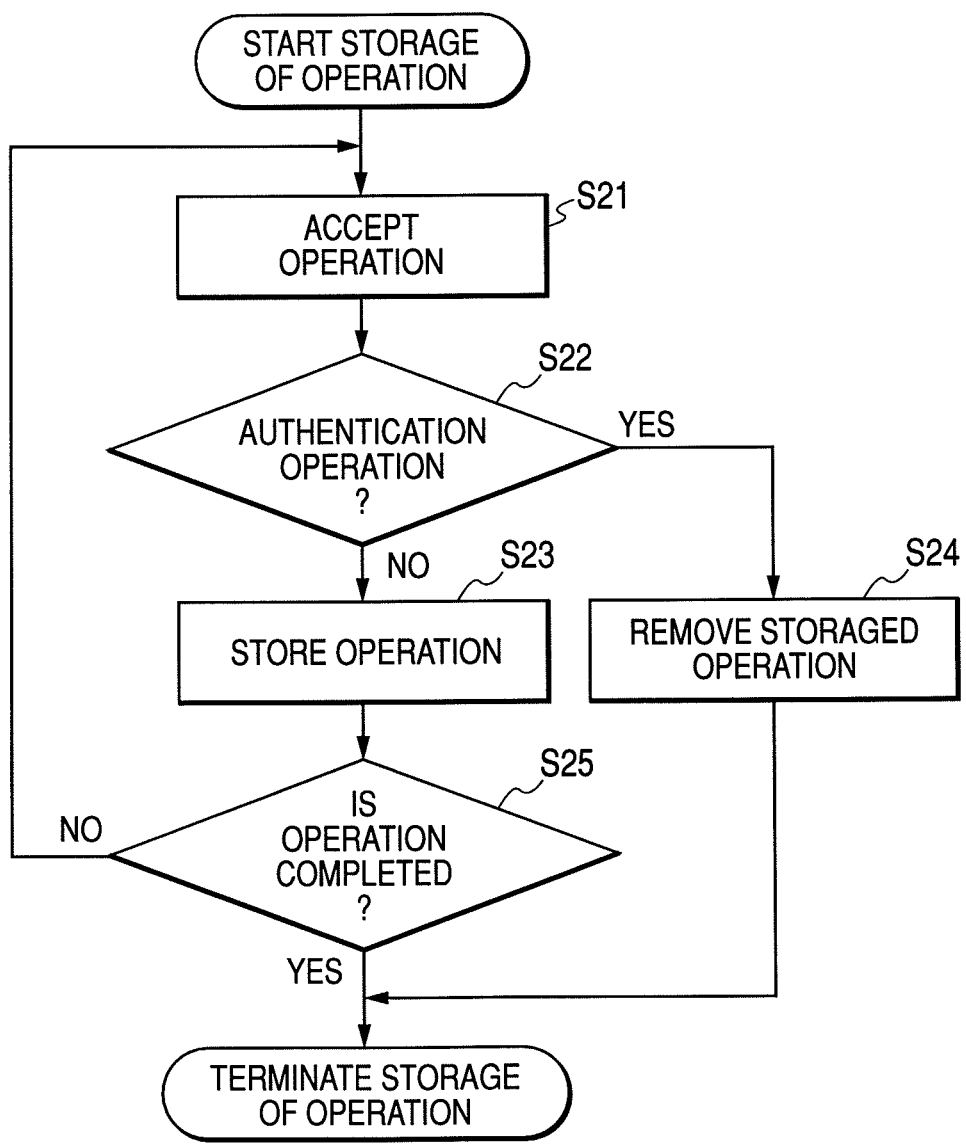
FIG. 5 is a flow chart illustrating the operation of a control unit according to a second embodiment.
Figure 6C:
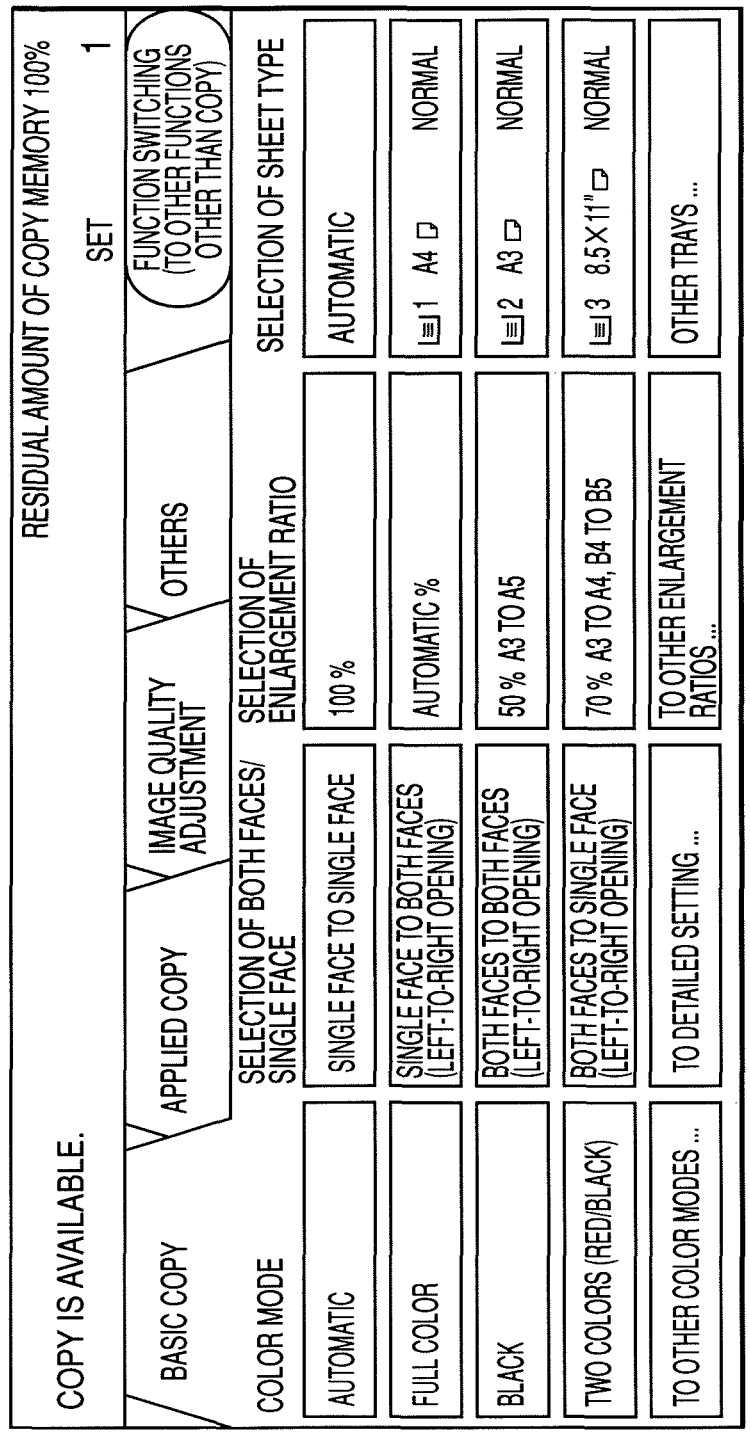

Next, a second embodiment of the present invention will be described. FIG. 5 is a flow chart illustrating the operation (control method) of a control unit according to the second embodiment, and FIGS. 6A to 7 are views respectively illustrating screens displayed on an operating panel according to the second embodiment.

In the second embodiment, in a case in which an operation requiring a predetermined authentication is performed when a predetermined operating procedure is stored, the control unit removes the operating procedure stored until that time. According to the control method by the control unit 1, first, when the storage of an operation starts, the selected operation is accepted as shown in step S21. As shown on the screen of FIG. 6A, the storage of an operation starts by selecting a 'registration' button and by selecting one of button numbers corresponding to 'unregistered' memories. FIG. 6B shows a screen displayed when a button corresponding to the storing operation is selected. In FIG. 6B, a 'copy' button is selected.

Next, the control unit 1 determines whether the accepted operation is an authentication operation (step S22 in FIG. 5). As shown on the screen of FIG. 6B, for example, when the 'copy' button is selected to perform the copy operation, it is not necessary to perform the authentication operation in step S22 shown in FIG. 5, so that the process proceeds to step S23 to store the operation. When the 'copy' button is pushed, the screen changes to a general copy condition setting screen shown in FIG. 6C.

When an operation to be performed remains, it is determined that the operation is not completed in step S25, so that the process returns to step S21 to wait for accepting the next operation. Then, for example, in order to move to a machine administrator mode, it is necessary to enter a password (hard key). In this case, the screen changes to a screen for entering a password, as shown in FIG. 7A.

The control unit 1 determines that this operation is the authentication operation in step S22, and then performs step S24. In step S24, in the stage of the authentication operation, the control unit removes the operations stored until that time. That is, since the operations stored until that time include the authentication operation, the authentication operation cannot be stored. In addition, when the authentication operation is not included, the storing operation is completed by pushing a predetermined key at a stage in which a series of operations is completed.

As such, when the authentication operation is detected during the storing operation, the operations stored until that time are removed to stop the storing operation, so that a series of operations including the authentication operation is not stored in a memory, which makes it possible to improve the security of information.

Further, in the second embodiment, when the authentication operation is included, the operations stored until this time are removed. However, the operations stored until this time may not be removed by a switching unit (for example, setting in the machine administrator mode). In this way, it is possible to select whether to store a series of operations including the authentication operation or not, if necessary, which results in the improvement of the convenience of users.

Figure 8:
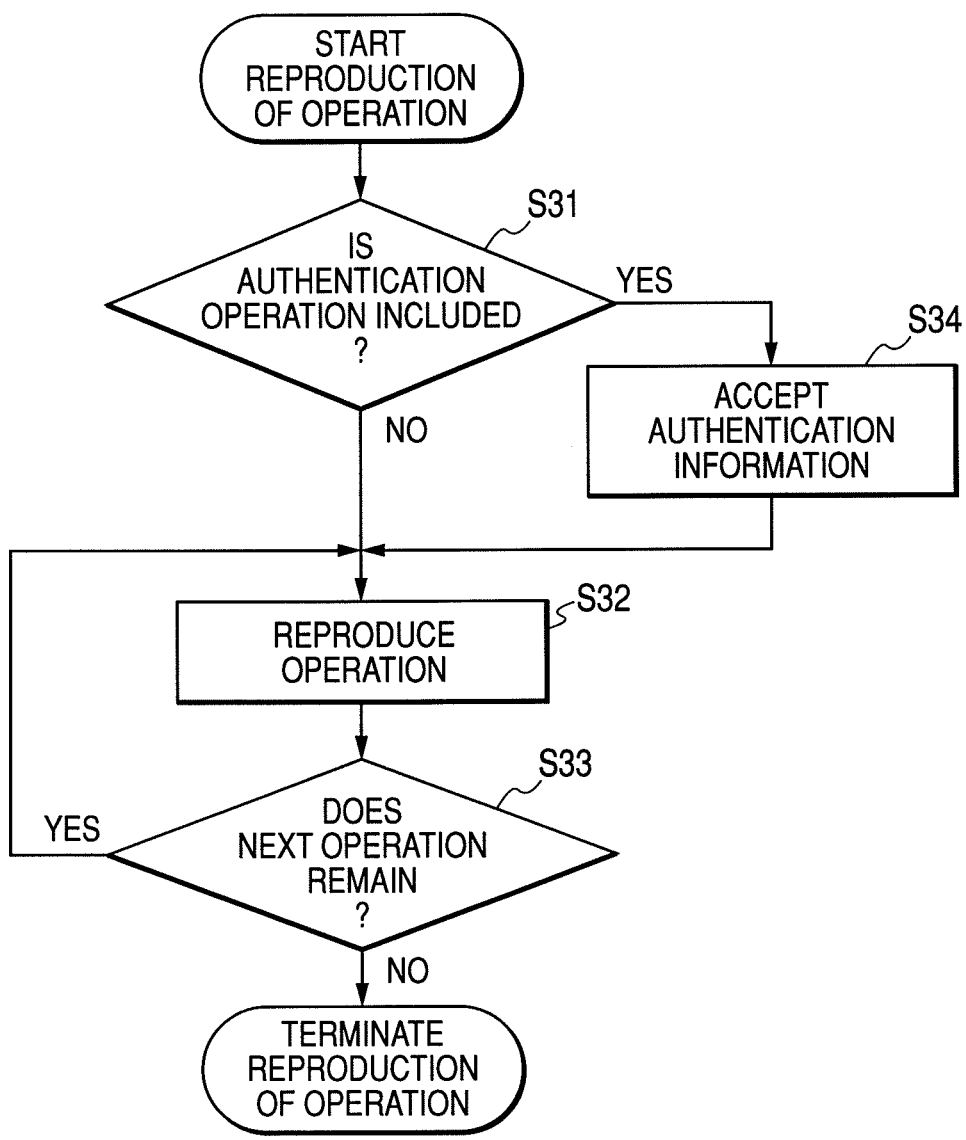
FIG. 8 is a flow chart illustrating the operation of a control unit according to a third embodiment.

Next, a third embodiment of the present invention will be described. FIG. 8 is a flow chart illustrating the operation (control method) of a control unit according to the third embodiment, and FIGS. 9A to 10C are views respectively illustrating screens displayed on an operating panel according to the third embodiment.

In the third embodiment, in reproducing the stored operating procedure, when an operation requiring a predetermined authentication is included in the operating procedure, the control unit allows information (authentication information) related to the predetermined authentication to be accepted, prior to the reproduction of the operating procedure. According to the control method by the control unit 1, first, when the reproduction of the stored operation starts, it is determined that the authentication operation is included in the operations to be reproduced as shown in step S31. When a certain operation is stored, a flag indicating the authentication operation is stored therein. Therefore, it is possible to perform the determination according to whether the flag is included or not.

When it is determined that the authentication operation is not included, that is, 'No' in step S31, the primary operation of the stored operations is reproduced. Meanwhile, when the authentication operation is included, that is, 'Yes' in step S31, the process proceeds to step S34. In step S34, the authentication information corresponding to the included authentication operation is accepted.

As shown on the screen of FIG. 9A, a 'call' button for calling the stored operation (job memory) is selected, and a button number corresponding to the stored operation is selected to start reproduction. FIG. 9B shows a screen for accepting the input of a password. In step S34, the acceptance of the authentication information is executed by performing this screen display.

When a user inputs authentication information, the authentication thereof is performed. As a result, when the authentication is succeeded, the stored primary operation is reproduced. On the other hand, when the authentication is failed, the reproduction is completed, and the process returns to the menu screen shown in FIG. 9A. Then, a screen requiring the reentry of a password appears. The number of reentries can be previously determined, and reproduction may be terminated when the authentication is not succeeded within the predetermined number of reentries.

Furthermore, when an operation to be performed remains, the process returns to step S32 to reproduce the next stored operation. When the last stored operation is reproduced, the reproduction is terminated. On the screen, after a password is entered at the beginning of the operation (FIG. 9B), a function switching screen shown in FIG. 9C is displayed to perform the section of the stored 'copy' button.

Figure 10A:
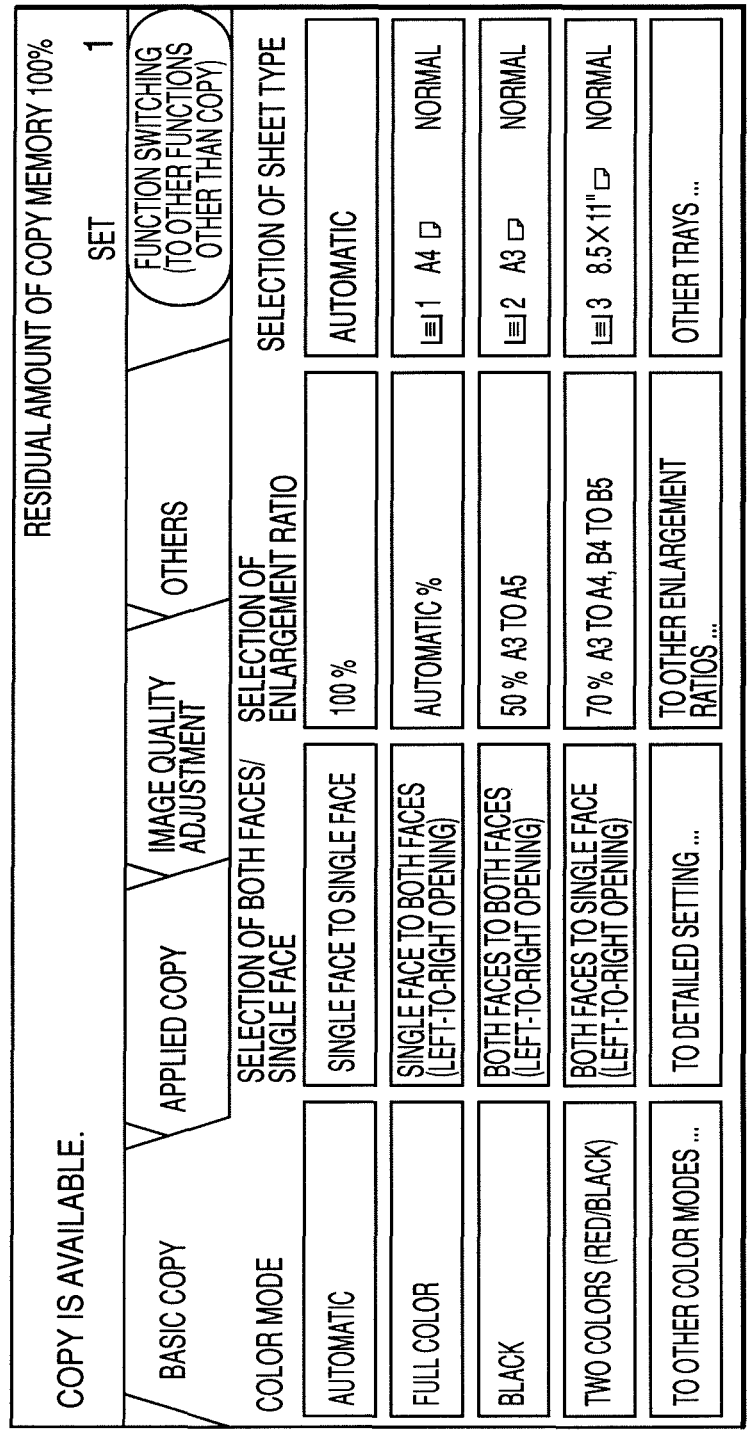

Thereafter, the copy condition setting screen shown in FIG. 10A is displayed, and the stored machine administrator menu (FIG. 10B), the stored selection operation of a 'specification setting/registration' button, and the specification setting/registration screen shown in FIG. 10C are sequentially displayed.

As such, prior to reproducing the stored operations, when the authentication operation is included in the stored operations, the input of the authentication information is performed before the operations are reproduced. Therefore, once the operations start, the operations are automatically performed up to the last operation. In addition, the authentication information is manually input. Therefore, when a user who does not know the authentication information attempts to perform reproduction, the operation is not normally processed since correct authentication information cannot be input. Further, since the authentication information must be obtained at the beginning, there is a merit in that the unauthorized user does not know which operation is stored.

Figure 11:
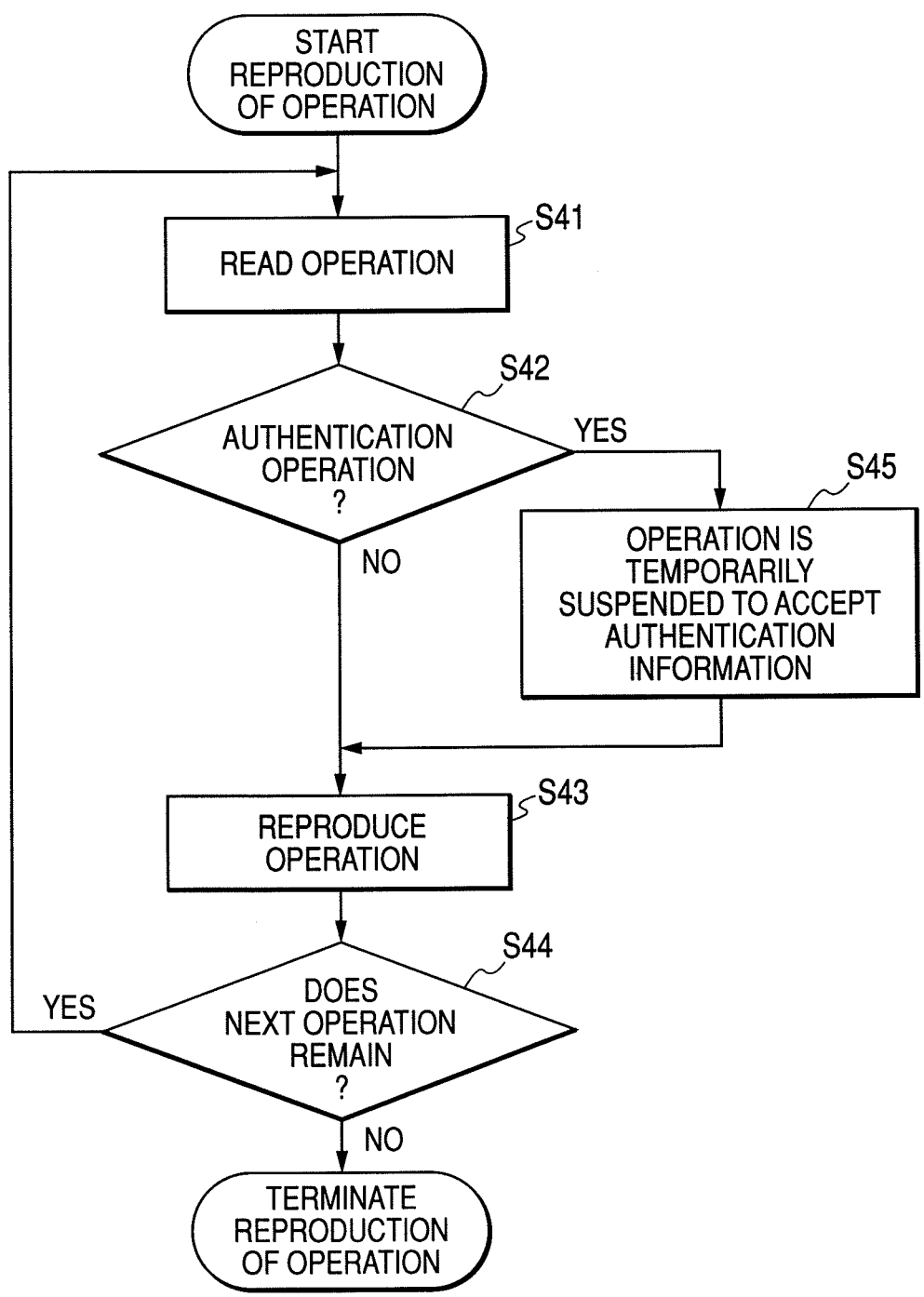
FIG. 11 is a flow chart illustrating the operation of a control unit according to a fourth embodiment.

Next, a fourth embodiment of the present invention will be described. FIG. 11 is a flow chart illustrating the operation (control method) of a control unit according to the fourth embodiment, and FIGS. 12A to 13C are views illustrating screens displayed on an operating panel according to the fourth embodiment.

In the fourth embodiment, in reproducing the stored operating procedure, when an operation requiring a predetermined authentication is included in the operating procedure, reproduction is temporarily suspended to accept information (authentication information) related to the authentication. According to the control method by the control unit 1, first, when the reproduction of the stored operations starts, the primary operation of the stored operations is read as shown in step S41.

Next, as shown in step S42, it is determined whether the read operation is the authentication operation. When a certain operation is stored, a flag indicating the authentication operation is stored therein. Therefore, the determination process can be performed according to whether the flag is included or not.

When the read operation is not the authentication operation, that is, 'No' in step S42, the process proceeds to step S43 to reproduce the read operation. In addition, when an operation to be performed remains, that is, 'Yes' in step S44, the process returns to step S41 to read the next operation.

On the other hand, when the read operation is the authentication operation, that is, 'Yes' in step S42, the process proceeds to step S45. In step S45, the reproduction of the operation is temporarily suspended to accept the authentication information.

Figure 12C:
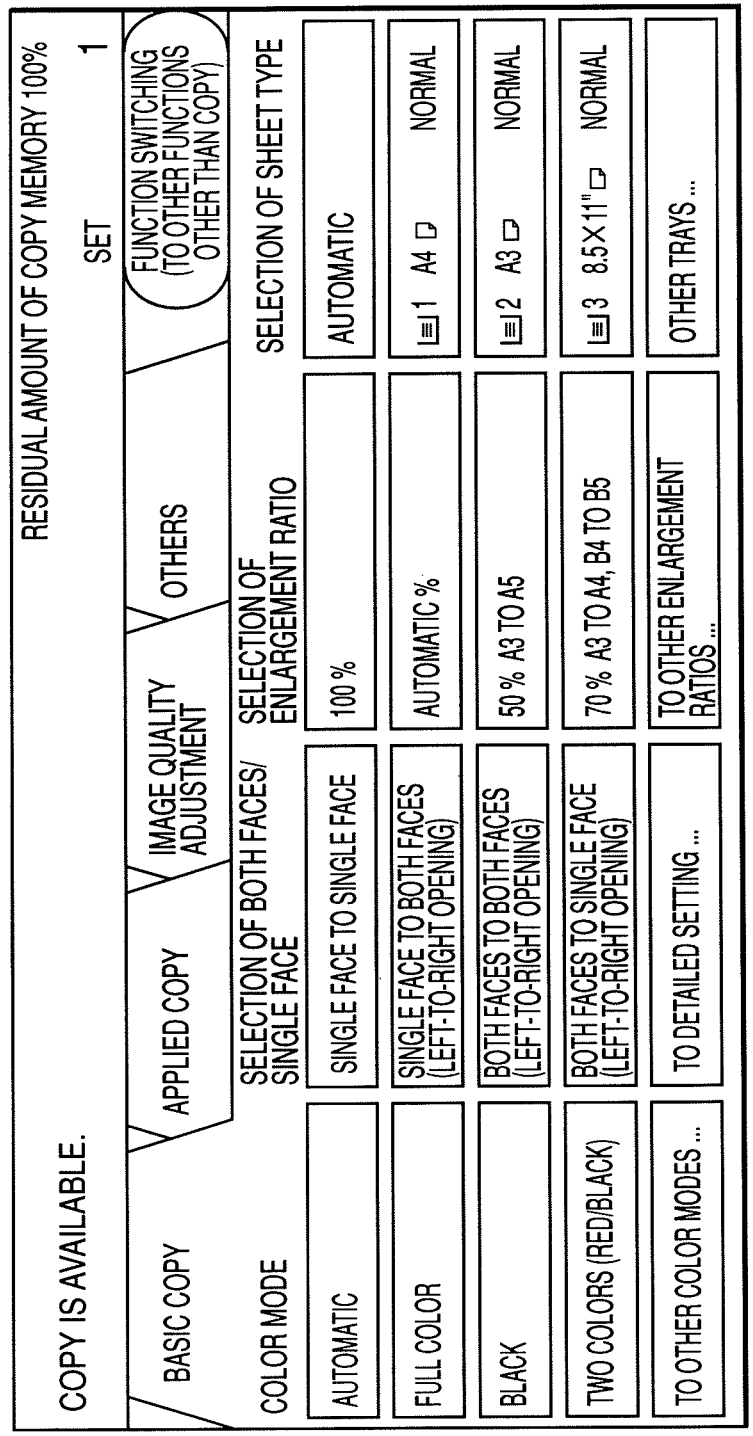

As shown on the screen of FIG. 12A, a 'call' button for calling the stored operation (job memory) is selected, and a button number corresponding to the memory where the authentication operation is stored is selected to start the operation stored corresponding to the button number. In FIG. 12B, the selection of a 'copy' button is performed. Then, the copy condition setting screen shown in FIG. 12C is displayed. Since there is no authentication operation until this stage, the above-mentioned processes are sequentially performed.

Next, when a button for moving to the machine administrator menu is selected to perform the reproduction operation, a screen for accepting the input of a password is displayed as shown in FIG. 13A, and the reproduction process is temporarily suspended in this stage.

When the user enters a password on this screen, authentication is performed. As a result, when the authentication is succeeded, the reproduction of the next operation starts. On the other hand, when the authentication is failed, the reproduction process is terminated. Then, the process returns to the menu screen shown in FIG. 12A, or the screen for requiring the reentry of the password is displayed. The number of reentries can be previously determined, and reproduction may be terminated when the authentication is not succeeded within the predetermined number of reentries.

After the authentication, the machine administrator menu shown in FIG. 13B, the stored selection operation of the 'specification setting/registration' button, and the specification setting/registration screen shown in FIG. 13C are sequentially displayed on the screen.

As such, when the authentication operation is included in the stored operations, the operations are automatically reproduced up to the authentication operation, and the reproduction process is temporarily suspended at the time of the authentication operation. In this case, since the reproduction process is resumed by manually inputting the authentication information, it is possible to prevent the user who does not know the authentication information from resuming the reproduction process.

FIGS. 14A and 14B are views showing menu (menu for the selection of a job memory) screens displayed when the stored operations are reproduced. FIG. 14A is a screen showing an example in which memories where the authentication operation is included in predetermined operations cannot be selected. For example, predetermined operations are stored in a memory corresponding to a number '1', and the authentication operation is included in the predetermined operations. Therefore, the button number '1' cannot be selected, and a message 'authentication is included' is displayed next to the button number. Meanwhile, predetermined operations are stored in a memory corresponding to a number '6', and the authentication operation is not included in the predetermined operations. Therefore, the button number '6' can be selected.

Further, these screens are displayed in a normal mode. However, in a mode for performing a predetermined authentication, such as a machine administrator mode, the button number corresponding to the memory including the authentication operation is displayed such that it can be selected.

FIG. 14B illustrates an example in which a message 'authentication is included' is displayed next to a number corresponding to the memory where the authentication operation is included in the operations. When the user who selects a memory number specifies the memory number next to which the message is displayed, the user can understand that the authentication operation must be performed. Therefore, it is possible to prevent the user who does not know the authentication operation from erroneously selecting the button number.

Figure 15:
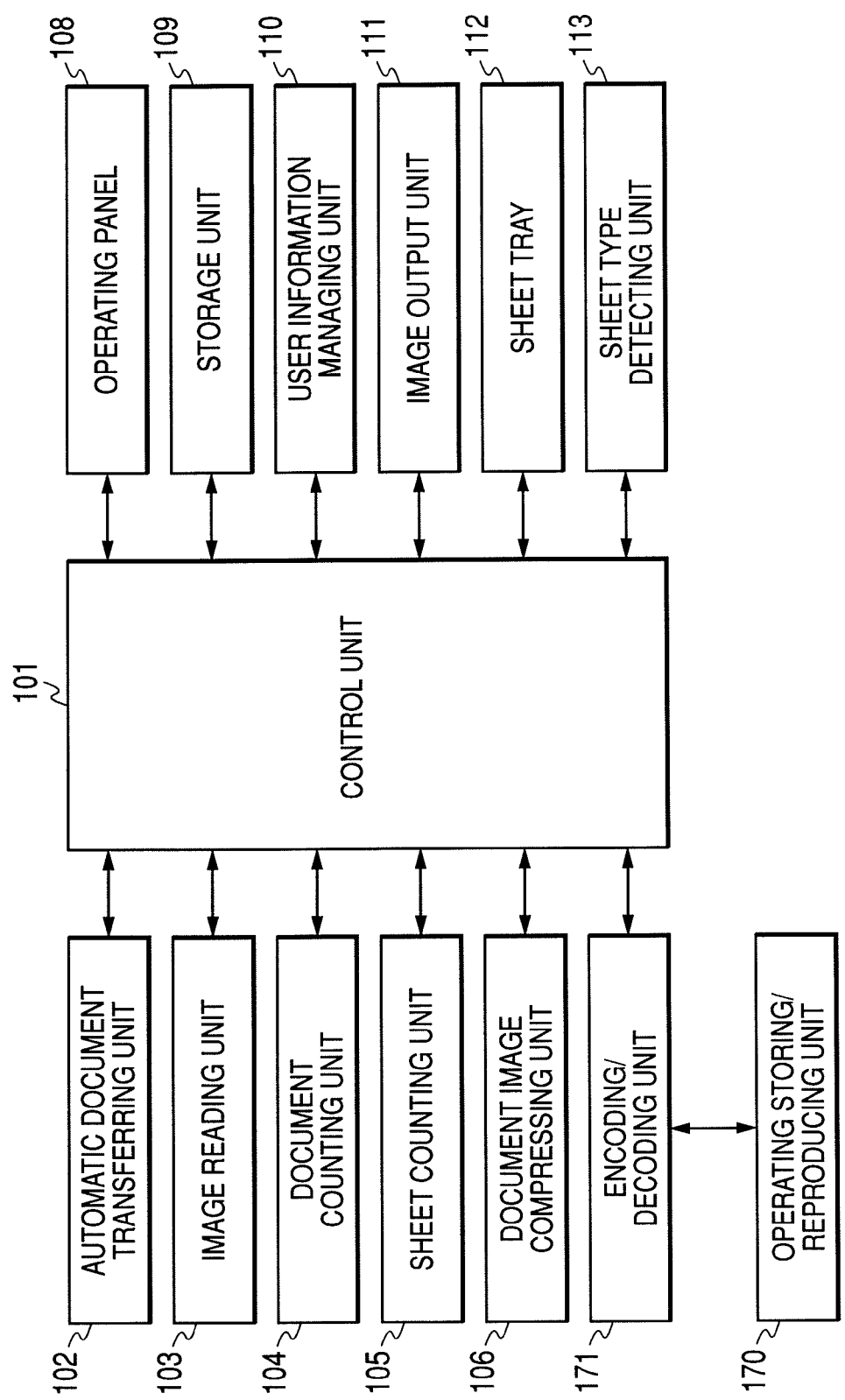
FIG. 15 is a block diagram illustrating a compound machine, which is an example of an electronic device according to the present invention.
Figure 17C:
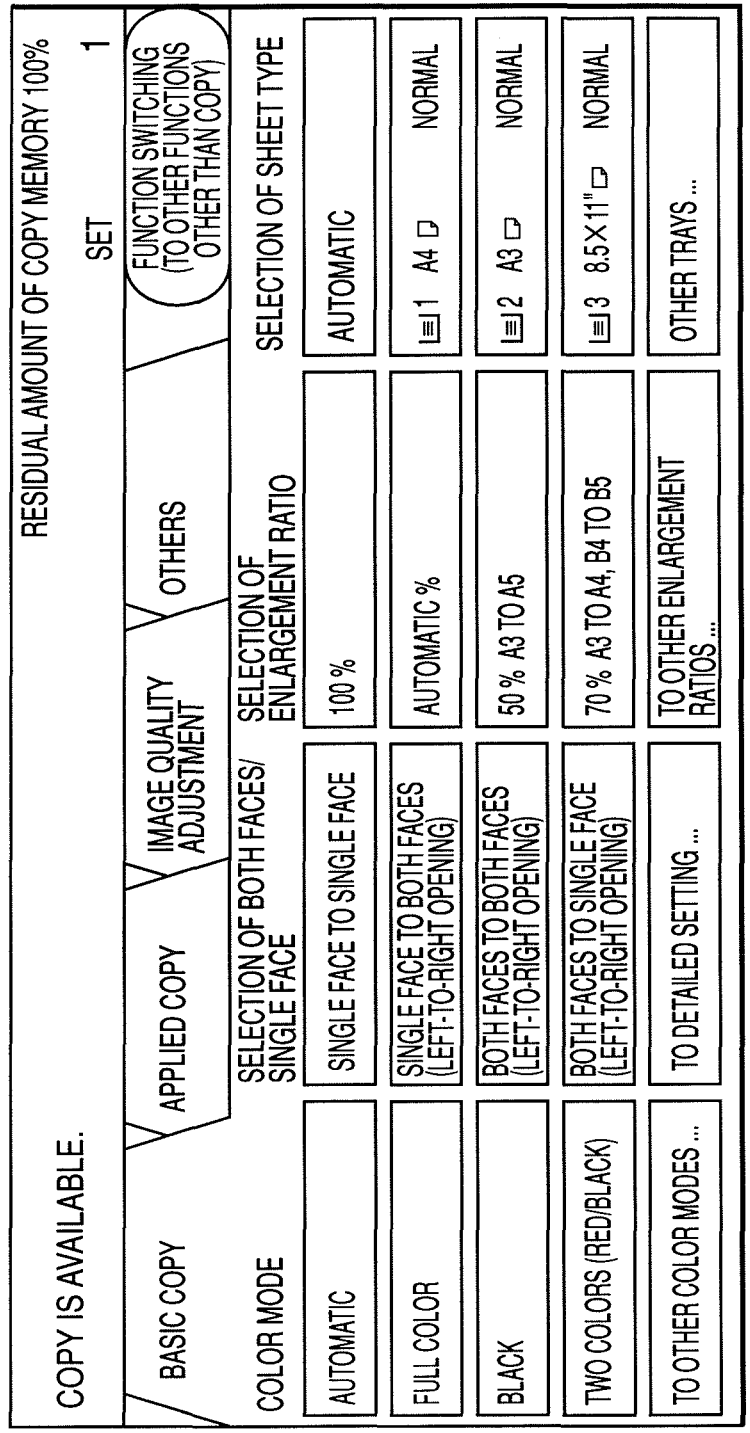

Next, a fifth embodiment of the present invention will be described with reference to the accompanying drawings. FIG. 15 is a block diagram illustrating a compound machine, which is an example of an electronic device according to the present embodiment. The compound machine includes a control unit 101, an automatic document transferring unit 102, an image reading unit 103, a document counting unit 104, a sheet counting unit 105, a document image compressing unit 106, an encoding/decoding unit 171, an operation storing/reproducing unit 170, an operating panel 108, a storage unit 109, a user information managing unit 110, an image output unit 111, a sheet tray 112, and a sheet type detecting unit 113.

In this compound machine, a predetermined operation procedure other than general operations (for example, a copy operation, a facsimile operation, and a printing operation) is stored as a job memory. Then, the compound machine performs a typical process by reading and reproducing the stored job memory. For example, a series of operations, such as the selection of the facsimile operation, the selection of a predetermined destination, the reading of a document, a telephone connection, and the transmission of a document image, can be stored. Then, when the same process is performed, it is possible to simply perform the same process only by selecting a button for calling the stored contents thereof.

The present embodiment is characterized by improving the security level of information in using an electronic device having such an operating procedure storing/reproducing function. That is, in the electronic device according to the present embodiment, the control unit 101 controls the function of storing the operating procedure such that, when an operation requiring a predetermined authentication is stored, the encoding/decoding unit 71 encodes information (authentication information) related to the authentication to store it. In addition, when the stored operating procedure is reproduced, the control unit 101 allows the authentication information to be decoded in reproducing the operation requiring the predetermined authentication.

In the configuration in which the authentication information is encoded and stored, and the encoded authentication information is decoded at the time of reproduction, the authentication information cannot be used without decoding even when the authentication information is stored in the compound machine. Therefore, it is possible to improve the security of information. In addition, since the encoding/decoding of the authentication information is automatically performed inside the machine, the user can use the machine without any consciousness. That is, when storing the operating procedure, the user can register operations including the authentication operation. When reproducing the operating procedure, the user can perform a series of operations including the authentication operation with a simple manipulation.

First, the fifth embodiment will be described in detail. FIG. 16 is a flow chart illustrating the operation (control method) of a control unit according to the fifth embodiment, and FIGS. 17A to 18C show screens displayed on an operating panel according to the fifth embodiment.

In the fifth embodiment, in storing a predetermined operating procedure, when an operation requiring a predetermined authentication is performed, the control unit allows the authentication information to be encoded and stored. According to the control method by the control unit 101, first, when the storage of an operation starts, the selected operation is accepted as shown in step S111. As shown on the screen of FIG. 17A, the storage of the operation starts by selecting a 'registration' button and by selecting one of buttons corresponding to 'unregistered' memories. FIG. 17B shows a screen displayed when a button corresponding to the storing operation is selected. In FIG. 17B, a 'copy' button is selected.

Next, the control unit 101 determines whether the accepted operation is the authentication operation (step S112 in FIG. 16). As shown on the screen of FIG. 17B, for example, when the 'copy' button is selected to perform the copy operation, it is not necessary to perform the authentication operation in step S112, so that the process proceeds to step S113 to store the operation. When the 'copy' button is pushed, the screen changes to a general copy condition setting screen shown in FIG. 17C.

When an operation to be performed remains, it is determined that the operation is not completed in step S115, so that the process returns to step S111 to wait for accepting the next operation. Then, for example, in order to move to a machine administrator mode, it is necessary to enter a password (hard key). In this case, the screen changes to a screen for entering a password, as shown in FIG. 18A.

The control unit 101 determines that this operation is the authentication operation in step S112 and then performs step S114. In step S114, the control unit 101 allows the authentication operation to be stored and allows the encoding/decoding unit 171 to encode the authentication information (for example, a password) input by the authentication operation to store it.

In storing the authentication operation, a command for allowing a screen (for example, FIG. 18A) for inputting information related to the authentication to be displayed and a flag indicating the authentication operation are stored. Next, when a user enters a password and then pushes a 'confirm' button, the encoding/decoding unit 171 encodes the entered password to store it.

When the authentication information, such as a password, is input, user authentication is performed. When the authentication is succeeded, the next operation is performed. An example of a machine administrator menu is shown in FIG. 18B. Subsequently, for example, when a 'specification setting/registration' button is pushed, the screen shown in FIG. 18C appears, so that it is possible to set up various items. Such a series of operations is also stored. When the operation is completed, a predetermined key is pushed to complete the storing operation. In this way, a series of operations from the storing operation is stored corresponding to the unregistered numbers displayed on the screen of FIG. 17A.

As such, when the authentication operation is included, the control unit performs control such that information (authentication information, such as a password) related to authentication is encoded and stored. Therefore, when the information stored in the machine leaks, it is possible to prevent the authentication information from directly being revealed to the outside since the authentication information is encoded.

Further, in the fifth embodiment, the authentication information is encoded and stored. However, the control unit performs control such that the authentication information is stored without encoding by a switching unit (for example, setting in the administrator mode). In this way, it is possible to store the encoded authentication information or to store the authentication information without encoding, if necessary, which results in the improvement of the convenience of users.

Figure 19:
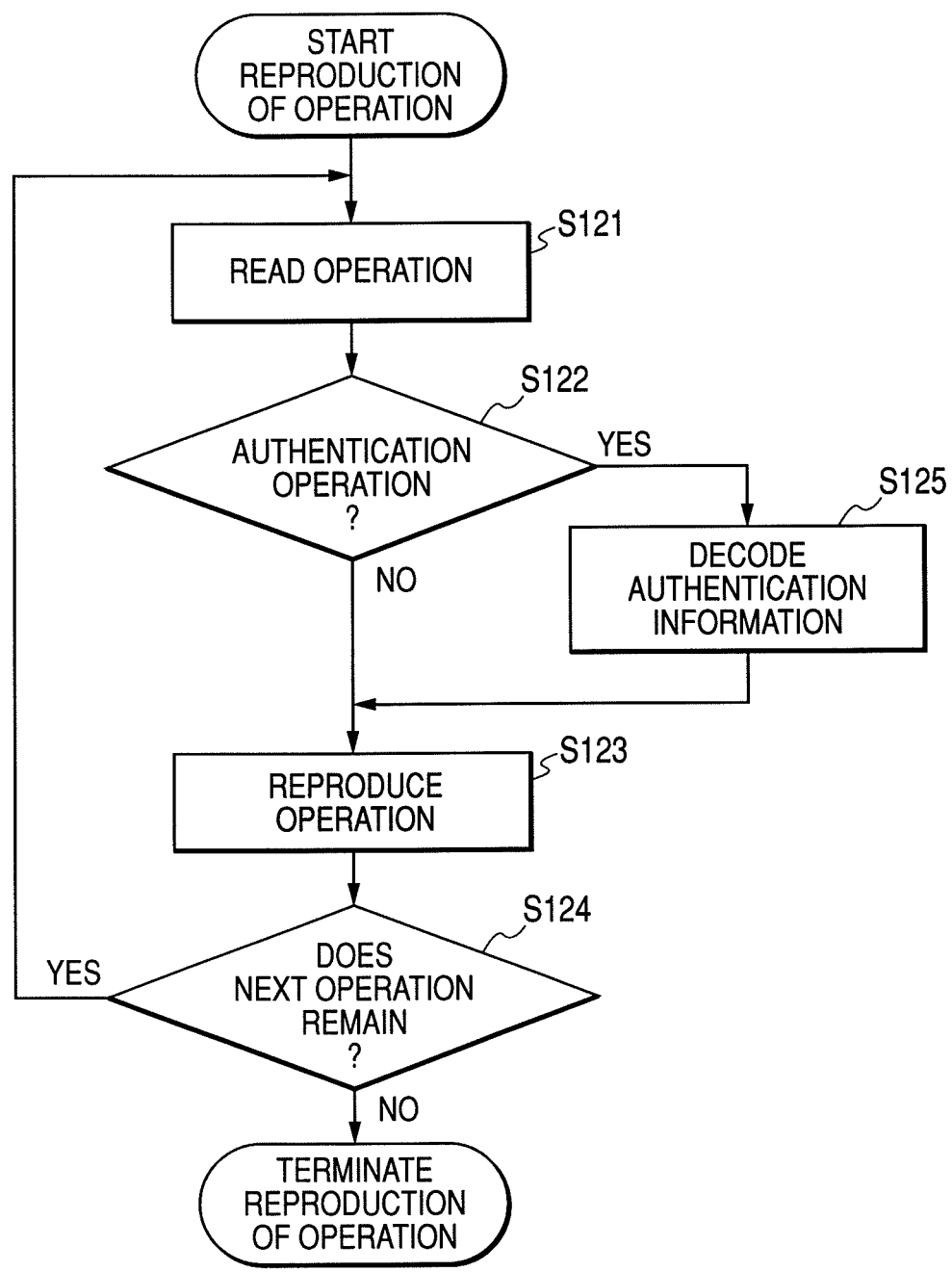
FIG. 19 is a flow chart illustrating the operation of a control unit according to a sixth embodiment.

Next, a sixth embodiment of the present invention will be described. FIG. 19 is a flow chart illustrating the operation (control method) of a control unit according to the sixth embodiment, and FIGS. 20A to 21C are views respectively illustrating screens displayed on an operating panel according to the sixth embodiment.

In the sixth embodiment, in reproducing the stored operating procedure, when an operation requiring a predetermined authentication is included in the operating procedure, the control unit allows the encoded authentication information to be decoded. According to the control method by the control unit 101, first, when the reproduction of the stored operation starts, the primary operation of the stored operations is read as shown in step S121.

Next, as shown in step S122, it is determined whether the read operation is the authentication operation. When a certain operation is stored, a flag indicating the authentication operation is stored therein. Therefore, it is possible to perform the determination process according to whether the flag is included or not.

When the read operation is not the authentication information, that is, 'No' in step S122, the process proceeds to step S123 to reproduce the read operation. In addition, when an operation to be performed remains, that is, 'Yes' in step S124, the process returns to step S121 to read the next operation.

On the other hand, when the read operation is the authentication operation, that is 'Yes' in step S122, the process proceeds to step S125. In step S125, the encoded authentication information is decoded by the encoding/decoding unit 71, and the authentication operation is then performed. In this way, the authentication operation is performed using the previously stored authentication information (step S123).

Figure 20C:
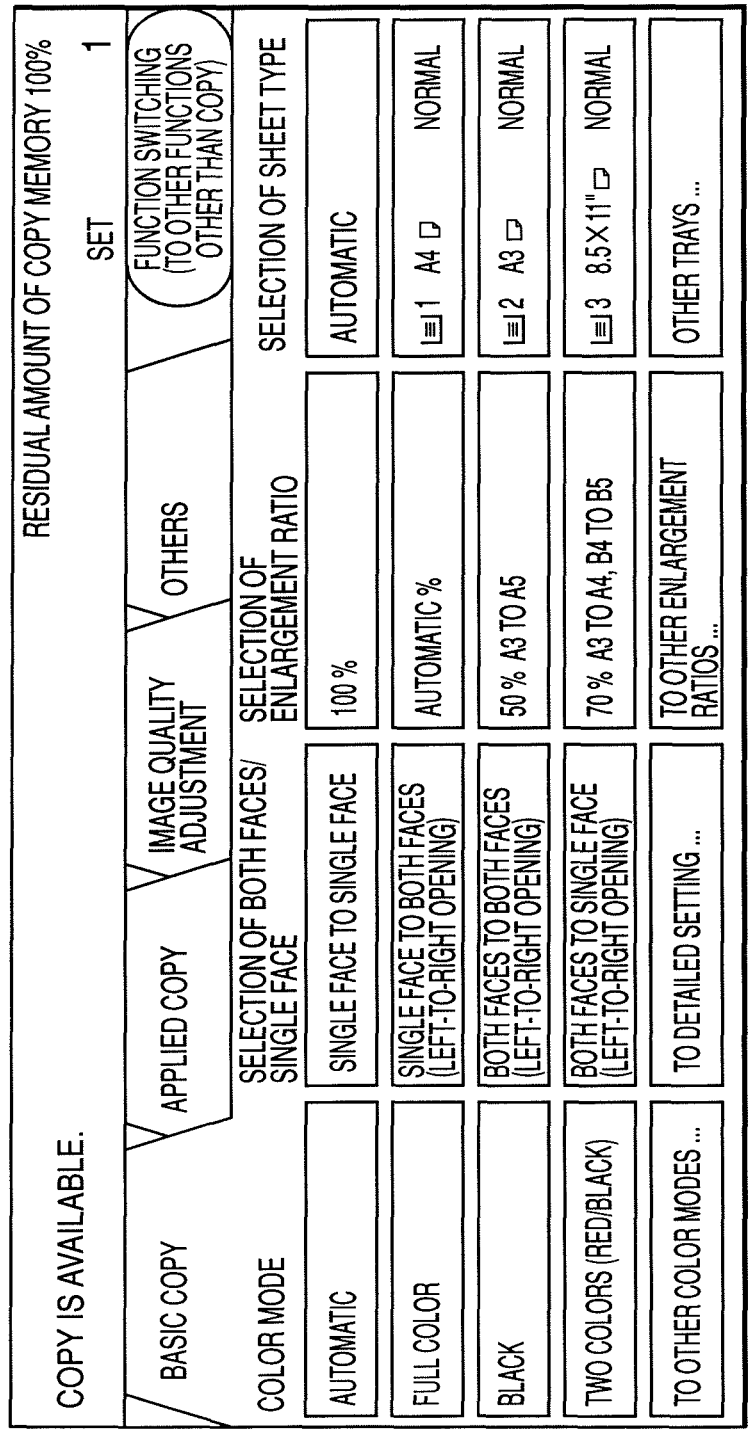

As shown on the screen of FIG. 20A, a 'call' button for calling the stored operation (job memory) is selected, and a button number corresponding to the stored operation is selected, so that the operation stored corresponding to the number starts. In FIG. 20B, a 'copy button' is selected. Thereafter, the copy condition setting screen shown in FIG. 20C is displayed. Since the authentication operation is not performed until this stage, the above-mentioned processes are sequentially performed.

As the operation to be reproduced, when a button for moving to the machine administrator menu is selected, a screen for inputting a password is displayed as shown in FIG. 21A, and the decoded authentication information (here, a password) is automatically input.

Further, authentication is performed using this authentication information, and then the next operations are sequentially reproduced. For example, the machine administrator menu shown in FIG. 21B, the stored selection operation of a 'specification setting/registration' button, and the specification setting/registration screen shown in FIG. 21C are sequentially displayed on the screen.

As such, when the authentication operation is included in the stored operations, the stored authentication information (the encoded authentication information) is automatically decoded for use. Therefore, the user can allow a series of operations to be automatically performed, without being conscious of the fact that the authentication information is automatically encoded/decoded in the machine.

Further, as described above, in a case in which the authentication operation is included in the stored operations and the stored authentication information (the encoded authentication information) is automatically decoded for use, a configuration can be used in which, when registering the storing operation, a screen for entering a password is displayed for a user to enter the password, and when reading the stored operation, the screen for entering a password is also displayed, so that the operating procedure can be reproduced when the password entered at this time is identical to that entered at the time of registration. In this way, by setting a password for every stored operating procedure, it is possible to prevent unauthorized users from reproducing the operations including the authentication operation, and thus it is possible to improve the security of information in storing the operations including the authentication operation.

Further, in the compound machine according to the present embodiment, when the authentication information is stored, the switching between the encoding operation of the authentication information and the non-encoding operation thereof is performed. Further, the switching between the storing operation of the authentication information and the non-storing operation thereof may be performed. That is, when the operation requiring the authentication information is stored, the operation thereof is stored, but the authentication information is not stored. Thus, it is possible to improve the security of information management. For example, the switching operation can be set in the machine administrator mode. This switching operation enables the user to select a necessary function, thereby improving the convenience of users.

Figure 22:
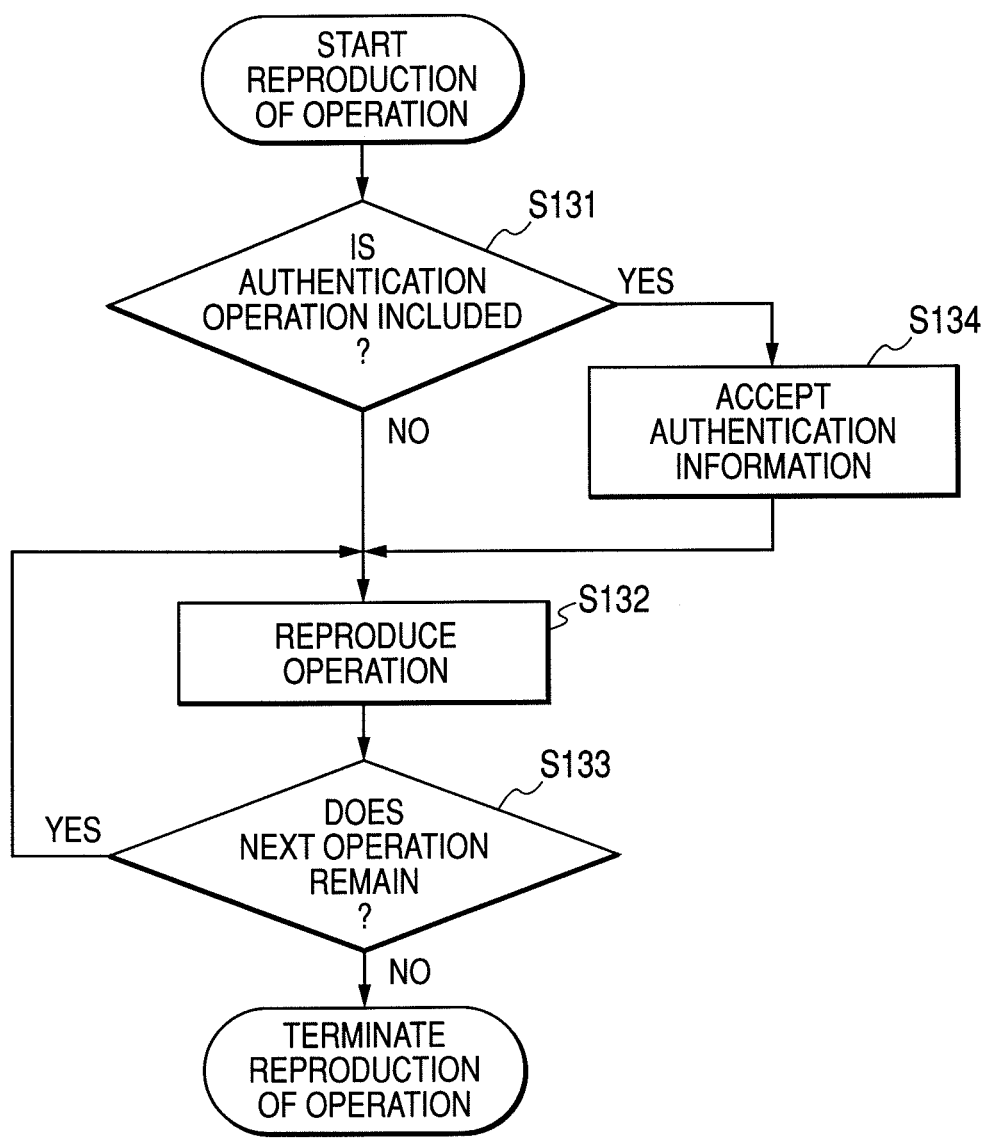
FIG. 22 is a flow chart illustrating the operation of a control unit in the reproducing operation (part 1)

Hereinafter, the reproducing operation when the authentication information is not stored will be described. FIG. 22 is a flow chart illustrating the reproducing operation (part 1), and FIGS. 23A to 24C are views illustrating screens displayed on an operating panel according to the reproducing operation (part 1).

In the reproducing operation (part 1), when an operation requiring a predetermined authentication is included in the operating procedure at the time when the stored operating procedure is reproduced, the control unit performs control such that information (authentication information) related to the predetermined authentication is accepted prior to the reproduction of the operating procedure. According to the control method by the control unit 101, first, when the reproduction of the stored operations starts, it is determined whether the authentication operation is included in these operations to be reproduced as shown in step S131. When a certain operation is stored, a flag indicating the authentication operation is stored therein. Therefore, it is possible to perform the determination according to whether the flag is included or not.

When it is determined that the authentication operation is not included, that is, 'No' in step S131, the primary operation of the stored operations is reproduced. On the other hand, when the authentication operation is included, that is, 'Yes' in step S131, the process proceeds to step S134. In step S134, the authentication information corresponding to the included authentication operation is accepted.

As shown on the screen of FIG. 23A, a 'call' button for calling the stored operation (job memory) is selected, and a button number corresponding to the job memory where the authentication information is stored is selected to start reproduction. FIG. 23B shows a screen for accepting the input of a password. In step S134, the acceptance of the authentication information is executed by performing this screen display.

When a user inputs authentication information, the authentication thereof is performed. As a result, when the authentication is succeeded, the stored primary operation is reproduced. On the other hand, when the authentication is failed, the reproduction is completed, and the process returns to the menu screen shown in FIG. 23A, so that a screen for requiring the reentry of a password appears. The number of reentries can be previously determined, and reproduction may be terminated when the authentication is not succeeded within the predetermined number of reentries.

Furthermore, when an operation to be performed remains, the process returns to step S132 to reproduce the next stored operation. When the last stored operation is reproduced, the reproduction is terminated. On the screen, after a password is entered at the beginning of the operation (FIG. 23B), a function switching screen shown in FIG. 23C is displayed to perform the section of the stored 'copy' button.

Thereafter, the copy condition setting screen shown in FIG. 24A is displayed, and the stored machine administrator menu (FIG. 24B), the stored selection operation of a 'specification setting/registration' button, and the specification setting/registration screen shown in FIG. 24C are sequentially displayed on the screen.

As such, prior to reproducing the stored operations, when the authentication operation is included in the stored operations, the input of the authentication information is performed before the operations are reproduced. Therefore, once the operations start, the operations are automatically performed up to the last operation. In addition, the authentication information is manually input. Therefore, when the user who does not know the authentication information attempts to perform reproduction, the operation is not normally processed since correct authentication information cannot be input. Further, since the authentication information must be obtained at the beginning, there is a merit in that the unauthorized user does not know which operation is stored.

Figure 25:
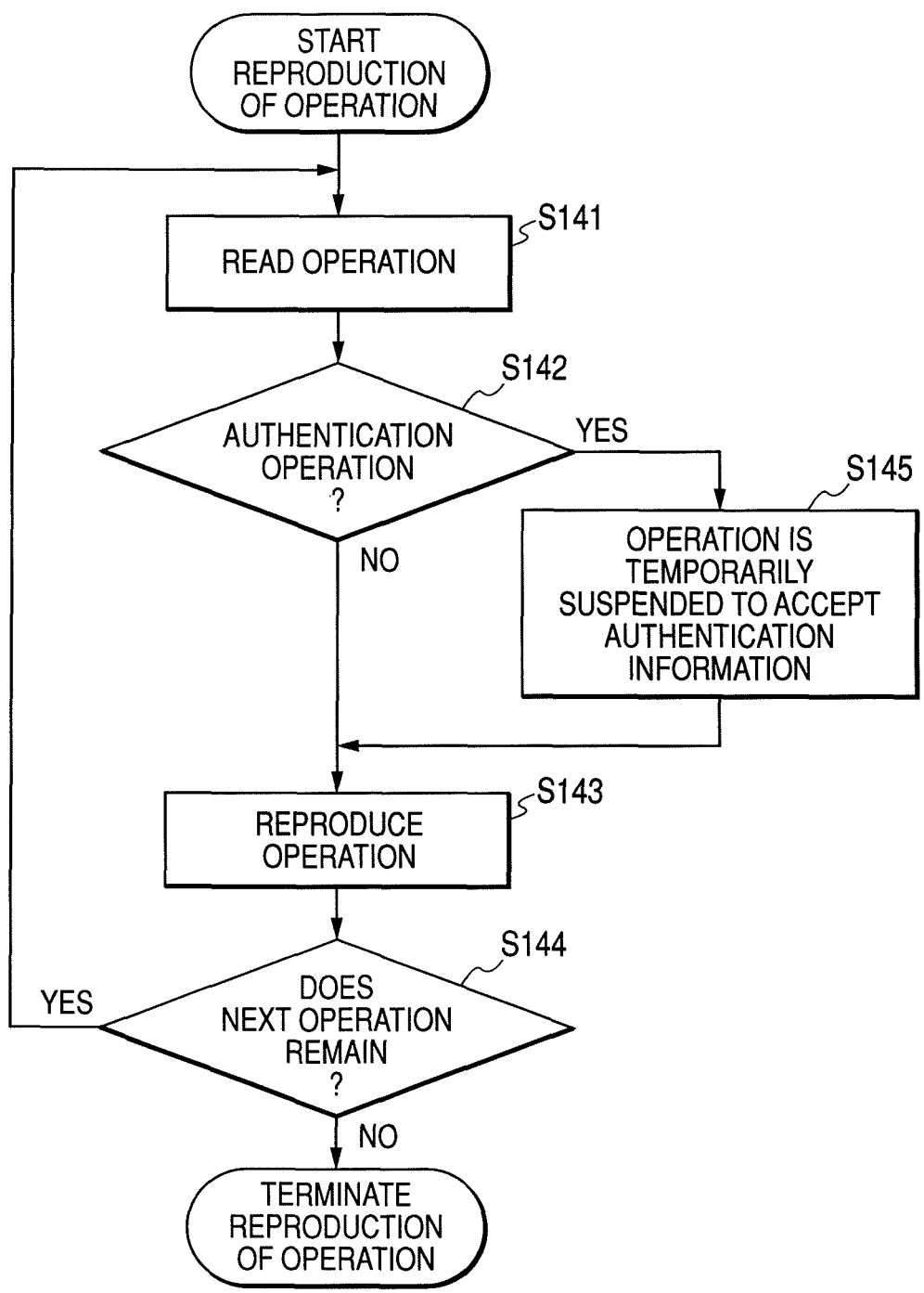
FIG. 25 is a flow chart illustrating the operation of a control unit in the reproducing operation (part 2)

Next, the reproducing operation (part 2) will be described. FIG. 25 is a flow chart illustrating the operation (control method) of a control unit according to the reproducing operation (part 2), and FIGS. 26A to 27C are views illustrating screens displayed on an operating panel according to the reproducing operation (part 2).

In the reproducing operation (part 2), the stored operating procedure is reproduced. Then, when an operation requiring a predetermined authentication is included in the operating procedure, reproduction is temporarily suspended to accept information (authentication information) related to the authentication. According to the control method by the control unit 101, first, when the reproduction of the stored operations starts, the primary operation of the stored operations is read as shown in step S141.

Next, as shown in step S142, it is determined whether the read operation is the authentication operation. When a certain operation is stored, a flag indicating the authentication operation is stored therein. Therefore, the determination process can be performed according to whether the flag is included or not.

When the read operation is not the authentication operation, that is, 'No' in step S142, the process proceeds to step S143 to reproduce the read operation. In addition, when an operation to be performed remains, that is, 'Yes' in step S144, the process returns to step S141 to read the next operation.

Meanwhile, when the read operation is the authentication operation, that is, 'Yes' in step S142, the process proceeds to step S145. In step S145, the reproduction of the operation is temporarily suspended to accept the authentication information.

Figure 26C:
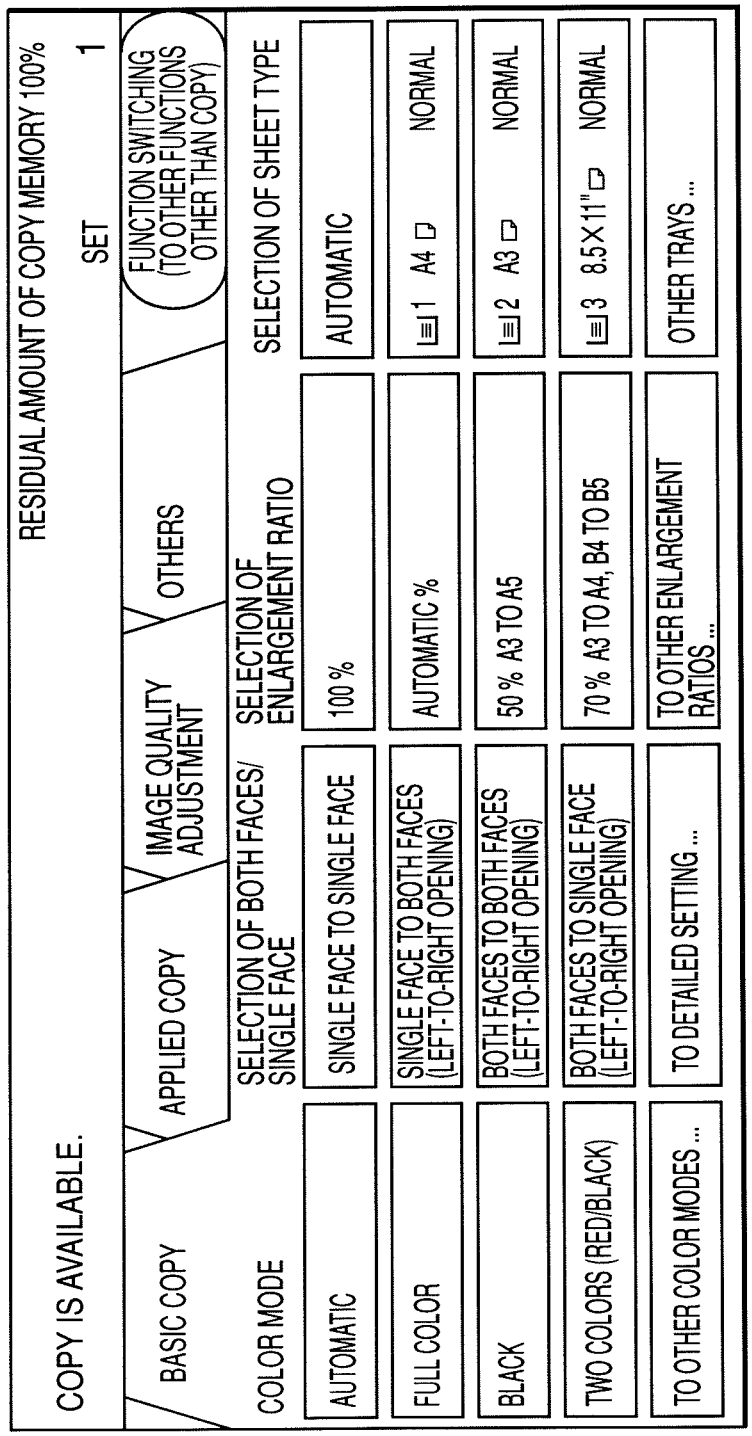

As shown on the screen of FIG. 26A, a 'call' button for calling the stored operation (job memory) is selected, and a button number corresponding to the memory where the authentication operation is stored is selected to start the operation stored corresponding to the button number. In FIG. 26B, the selection of a 'copy' button is performed. Then, the copy condition setting screen shown in FIG. 26C is displayed. Since there is no authentication operation until this stage, the above-mentioned processes are sequentially performed.

Next, when a button for changing to the machine administrator menu is selected to perform the reproduction operation, a screen for entering as password as shown in FIG. 27A is displayed, and the reproduction process is temporarily suspended in this stage.

When the user enters a password on this screen, authentication is performed. As a result, when the authentication is succeeded, the reproduction of the next operation restarts. On the other hand, when the authentication is failed, the reproduction process is terminated. Then, the process returns to the menu screen shown in FIG. 26A, or the screen for requiring the reentry of the password is displayed. The number of reentries can be previously determined, and reproduction may be terminated when the authentication is not succeeded within the predetermined number of reentries.

After the authentication, the machine administrator menu shown in FIG. 27B, the stored selection operation of a 'specification setting/registration' button, and the stored specification setting/registration screen shown in FIG. 27C are sequentially displayed on the screen.

As such, when the authentication operation is included in the stored operations, the operations are automatically reproduced up to the authentication operation, and the reproduction process is temporarily suspended at the time of the authentication operation. In this case, since the reproduction process is resumed by manually inputting the authentication information, it is possible to prevent the user who does not know the authentication information from resuming the reproduction process.

FIGS. 28A and 28B are views showing menu (menu for the selection of a job memory) screens displayed when the stored operations are reproduced. FIG. 28A is a screen showing an example in which memories where the authentication operation is included in predetermined operations cannot be selected. For example, predetermined operations are stored in a memory corresponding to a number '1', and the authentication operation is included in the predetermined operations. Therefore, the button number '1' cannot be selected, and a message 'authentication is included' is displayed next to the button number. Meanwhile, predetermined operations are stored in a memory corresponding to a number '6', and the authentication operation is not included in the predetermined operations. Therefore, the button number '6' can be selected.

Further, these screens are displayed in a normal mode. However, in a mode for performing a predetermined authentication, such as a machine administrator mode, the button number corresponding to the memory including the authentication operation is displayed such that it can be selected.

FIG. 28B illustrates an example in which a message 'authentication is included' is displayed next to the number corresponding to the memory where the authentication operation is included in the operations. When the user who selects a memory number specifies the memory number next to which the message is displayed, the user can understand that the authentication operation must be performed. Therefore, it is possible to prevent the user who does not know the authentication operation from erroneously selecting the button number.

Further, in a case in which a menu screen is displayed after the predetermined authentication, when the authentication information used for the authentication is not identical to the authentication information of the authentication operation included in the previously stored operations, a message 'authentication information does not correspond' is displayed next to the registration number thereof. In this way, the user can understand that it is difficult to perform the operations using the currently input authentication information.

Various control methods performed by the control unit 1 according to the present embodiment can be executed by programs. In addition, in the present embodiment, the compound machine is taken as an example of an electronic device. However, the present invention can be applied to various apparatuses capable of storing a series of operation (for example, a printer, a facsimile, a duplicating machine, and a vending machine).

The entire disclosure of Japanese Patent Application No. 2004-019221 filed on Jan. 28, 2004, and No. 2004-019222 filed on Jan. 28, 2004 including specification, claims, drawings and abstract is incorporated herein by reference in its entirety.

What is claimed is:

1. An electronic device comprising:
a reception unit that receives first and second requests inputted by a user, the first request for performing a plurality of input operations;
a memory configured to store, in an order of performing operations, the input operations of the first request received by the reception unit as one operating procedure; and
a control unit that controls performing a process sequentially by reproducing the operating procedure of the first request stored by the memory so as to transit displays sequentially according to the first request when the reception unit receives the second request, each display corresponding to each input operation of the first request;
wherein, in a case that one of the input operations of the first request includes information relating to an authentication when the memory stores the operating procedure of the first request, the control unit controls the memory not to store the information relating to the authentication as the operating procedure of the first request,
wherein when the reception unit receives the second request and the operating procedure of the first request stored by the memory, from which the information relating to an authentication is not stored, is reproduced, the control unit controls so that a user is requested to input the information relating to an authentication so that the reproducing of the operating procedure of the first request is completed.

2. The electronic device according to claim 1, wherein the control unit has a switching unit that switches whether to store the information related to the authentication.

3. The electronic device according to claim 1, wherein the information related to the authentication is a password.

4. The electronic device according to claim 1, wherein the information related to the authentication is a password entered by a user to perform the authentication.

5. The electronic device according to claim 1, wherein the control unit controls the memory to store input operations of information except the authentication information as the operating procedure.

6. An electronic device comprising:
a reception unit that receives first and second requests inputted by a user the first request for performing a plurality of input operations;
a memory configured to store, in an order of performing operations, the input operations of the first request received by the reception unit as one operating procedure; and
a control unit that controls performing a process sequentially by reproducing the operating procedure of the first request stored by the memory so as to transit displays sequentially according to the first request when the reception unit receives the second request, each display corresponding to each input operation of the first request;
wherein, in a case that one of the input operations of the first request includes information relating to an authentication when the memory stores a first operating procedure of the first request, the control unit controls removing the input operations of the first request from the memory.

7. The electronic device according to claim 6,
wherein the control unit has a switching unit that switches whether to remove the stored operating procedure.

8. The electronic device according to claim 6, wherein the input operations removed includes an authentication procedure.

9. A controlling method of an electronic device, the method comprising:
receiving first and second requests inputted by a user, the first request for performing a plurality of input operations;
storing, in an order of performing operations, the received input operations of the first request as one operating procedure in a memory;
performing a process sequentially by reproducing the operating procedure of the first request stored in the memory so as to transit displays sequentially according to the first request when the second request is received, each display corresponding to each input operation of the first request; and
controlling, in a case that one of the input operations of the first request includes information relating to an authentication when the memory stores the operating procedure, to not to store information relating to the authentication as the operating procedure of the first request,
wherein when the second request and the operating procedure of the first request stored by the memory, from which the information relating to an authentication is not stored, is reproduced, controlling so that a user is requested to input the information relating to an authentication so that the reproducing of the operating procedure of the first request is completed.

10. The controlling method according to claim 9, wherein the information related to the authentication is a password.

11. The controlling method according to claim 9, wherein the information related to the authentication is a password entered by a user to perform the authentication.

12. A controlling method of an electronic device, the method comprising:
receiving first and second requests inputted by a user, the first request for performing a plurality of input operations;
storing, in an order of performing operations, the received input operations of the first request as one operating procedure in a memory;
performing a process sequentially by reproducing the operating procedure of the first request stored in the memory so as to transit displays sequentially according to the first request when the second request is received, each display corresponding to each input operation of the first request; and
controlling, in a case that one of the input operations of the first request includes information relating to an authentication when the memory stores the operating procedure, the memory to remove the input operations of the first request from the memory.

13. The controlling method according to claim 12, wherein the input operations removed includes an authentication procedure.

* * * * *